(12) United States Patent
Savage et al.

(10) Patent No.: US 12,510,919 B2
(45) Date of Patent: Dec. 30, 2025

(54) METHODS AND APPARATUS TO GENERATE WAVEFORMS

(71) Applicant: Texas Instruments Incorporated, Dallas, TX (US)

(72) Inventors: Ryan Patrick Savage, Richardson, TX (US); Stephen Phillip Savage, Colorado Springs, CO (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 311 days.

(21) Appl. No.: 18/115,686

(22) Filed: Feb. 28, 2023

(65) Prior Publication Data

US 2023/0280781 A1 Sep. 7, 2023

Related U.S. Application Data

(60) Provisional application No. 63/315,107, filed on Mar. 1, 2022.

(51) Int. Cl.
G06F 1/26 (2006.01)
G06F 1/04 (2006.01)

(52) U.S. Cl.
CPC . *G06F 1/04* (2013.01); *G06F 1/26* (2013.01)

(58) Field of Classification Search
CPC ........................................................ G06F 1/26
See application file for complete search history.

(56) References Cited

U.S. PATENT DOCUMENTS

| | | | | |
|---|---|---|---|---|
| 6,285,222 B1* | 9/2001 | Kitade | ................. | H03K 17/223 327/143 |
| 8,612,779 B2* | 12/2013 | More | ................... | G06F 1/3203 713/320 |
| 10,839,897 B1* | 11/2020 | Bai | ..................... | G11C 13/0069 |
| 2010/0013529 A1* | 1/2010 | Kawakita | ............... | H03K 17/22 327/143 |
| 2016/0094234 A1* | 3/2016 | Chou | ................... | H03M 1/002 341/118 |
| 2017/0064237 A1* | 3/2017 | Aibara | ................. | H04N 25/767 |
| 2018/0269787 A1* | 9/2018 | Chen | ..................... | H02M 3/156 |
| 2020/0333873 A1* | 10/2020 | El Sherif | ............. | G06F 1/3296 |
| 2023/0378804 A1* | 11/2023 | Nagda | ..................... | H02J 9/068 |
| 2024/0021129 A1* | 1/2024 | Kim | ..................... | G09G 3/3696 |

* cited by examiner

*Primary Examiner* — Phil K Nguyen
(74) *Attorney, Agent, or Firm* — Michael T. Gabrik; Frank D. Cimino

(57) ABSTRACT

An example apparatus includes a multiplexer; a first memory coupled to the multiplexer; a second memory coupled to the multiplexer, the second memory including a bi-level reset indicator, a multi-level reset indicator, and a duration indicator; a memory controller coupled to the multiplexer; and waveform generation circuitry coupled to the memory controller, the waveform generation circuitry including: a first power supply configured to receive the bi-level reset indicator; a second power supply configured to receive the multi-level reset indicator; and timing circuitry configured to receive the duration indicator.

7 Claims, 14 Drawing Sheets

METHODS AND APPARATUS TO GENERATE WAVEFORMS

CROSS-REFERENCE TO RELATED APPLICATION

This patent application claims the benefit of and priority to U.S. Provisional Patent Application Ser. No. 63/315,107 filed Mar. 1, 2022, which application is hereby incorporated herein by reference in its entirety.

TECHNICAL FIELD

This description relates generally to waveform generation, and more particularly to methods and apparatus to generate waveforms.

BACKGROUND

Reset is a duration of time where predefined reset operations are performed. As circuitry becomes increasingly complex, processes for performing reset operations have become relatively complex, all the while durations to perform the reset operations continue to decrease. Typically, generation of a reset signal causes circuitry to begin performance of reset operations. In some examples, a reset signal results in a performance of operations to set circuitry to known logic states. In other examples, a reset signal causes circuitry to synchronize a reference clock to a system clock. Some circuitry, such as memory systems, include multiple possible sets of reset operations. Differentiating between the multiple possible reset operations creates a need for complex reset signals capable of initiating each of the possible reset operations.

SUMMARY

For methods and apparatus to generate a waveform, an example apparatus includes a multiplexer; a first memory coupled to the multiplexer; a second memory coupled to the multiplexer, the second memory including a bi-level reset indicator, a multi-level reset indicator, and a duration indicator; a memory controller coupled to the multiplexer; and waveform generation circuitry coupled to the memory controller, the waveform generation circuitry including: a first power supply configured to receive the bi-level reset indicator; a second power supply configured to receive the multi-level reset indicator; and timing circuitry configured to receive the duration indicator.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
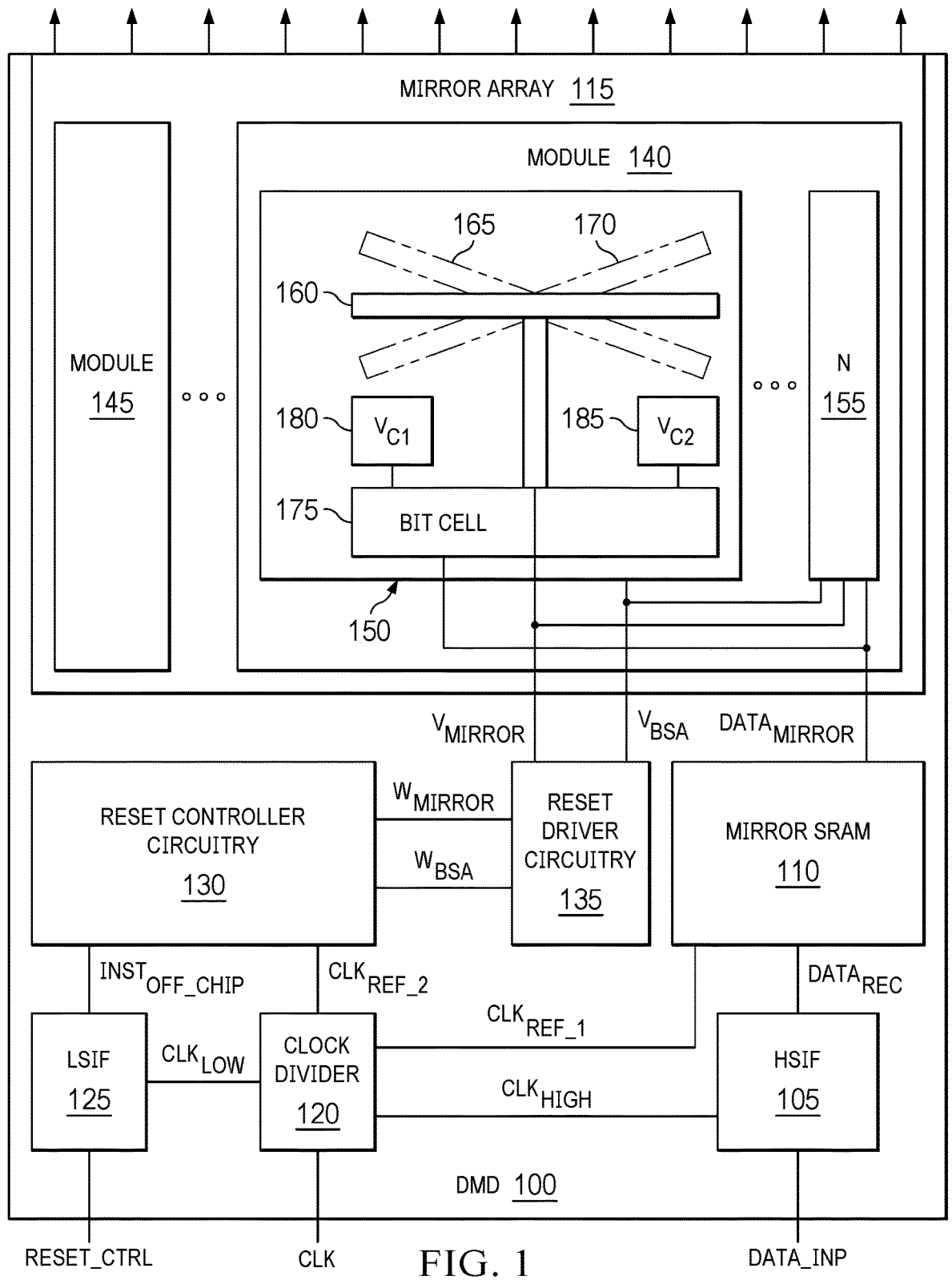
FIG. 1 is a block diagram of an example digital micromirror device (DMD) including reset controller circuitry configured to generate reset signals.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

As devices become increasingly complex, operations that occur during reset have become relatively complex. Reset is a duration of time where predefined reset operations are performed. Typically, reset operations cause circuitry to set, clear, and/or modify circuitry to predetermined states. Reset operations may cause circuitry to synchronize a system clock to a real-time clock. Reset operations may cause circuitry to set digital circuitry to predetermined states, such as clearing a series of flip-flops. Reset operations may cause circuitry to perform one of a plurality of different sets of reset operations based on a reset signal. Such reset operations result in circuitry needing a method of generating increasingly complex reset signals.

As reset operations become increasingly complex, waveform generation circuitry becomes increasingly common. Devices, such as spatial light modulators (SLMs), need reset signals capable of resetting memory cells to a plurality of potential reset states. In time sensitive applications, differentiating between the potential reset states results in waveform generation circuitry needing to accurately control voltages of reset signals at relatively high-speeds.

One such time sensitive application is a digital micromirror device (DMD), which positions an array of micromirrors to project an image. In such an application, accurately timing a reset signal could modify a position of a micro-mirror. As DMD technology becomes increasingly complex, waveform generation circuitry needs to be capable of generating increasingly complex reset signals at increasing speeds. Other time sensitive applications, such as a liquid crystal on silicon (LCOS), a liquid crystal display (LCD), micro LED, etc., would benefit from such waveform generation circuitry.

Off-chip waveform generation processes generate signals using instructions from an off-chip source, such as an external device. The off-chip source supplies a first instruction to set a signal to a first voltage followed by a second instruction to set the signal to a second voltage. Such a method of waveform generation relies on sequential instructions from the off-chip source to create the signal. Although off-chip control may be capable of generating relatively complex signals, changes in the signal can only occur as fast as the off-chip source is able to transmit instructions. Off-chip waveform generation is limited to speeds at which the off-chip source generates and transmits instructions.

On-chip waveform generation uses instructions stored on-chip to control signal generation. On-chip waveform generation circuitry executes each instruction using predetermined timings. Storing instructions on-chip limits on-chip waveform generation circuitry to generation of predefined signals. Such a method of storing hard coded instructions in the local memory limits the waveform generation circuitry to predetermined signals.

The examples described herein include example reset controller circuitry capable of generating reset signals based on both on-chip and off-chip instructions. In some described examples, the reset controller circuitry includes waveform generation circuitry that generates reset signals based on instructions from a local memory. The waveform generation circuitry described herein uses instructions that include a bi-level reset indicator, a multi-level reset indicator, and a duration indicator. The bi-level reset indicator causes generation of a first reset signal. Each possible value of the reset indicator causes the first reset signal to be set to a different voltage. The multi-level reset indicator causes generation of a second reset signal by specifying a voltage of the second reset signal as one of multiple potential voltage levels. The duration indicator represents a duration between instructions as a counter value.

Advantageously, by including timing information in the instruction the reset controller circuitry may accurately generate a plurality of reset signals using both on-chip and off-chip control. Advantageously, using on-chip and off-chip instructions to generate reset signals simplifies an integration complexity of the waveform generation circuitry. Advantageously, using on-chip and off-chip instructions to generate reset signals allows for arbitrary waveform generation using a plurality of off-chip instructions capable of being executed at speeds approximately equal to that of on-chip instructions.

FIG. 1 is a block diagram of an example DMD 100 configured to generate reset signals using on-chip and off-chip instructions. In the example of FIG. 1, the DMD 100 includes an example high-speed interface (HSIF) 105, an example mirror static random access memory (SRAM) 110, an example mirror array 115, an example clock divider 120, an example low-speed interface (LSIF) 125, example reset controller circuitry 130, and example reset driver circuitry 135. The DMD 100 modulates light using the mirror array 115.

The HSIF 105 is coupled to the mirror SRAM 110 and the clock divider 120. The HSIF 105 receives a relatively high-speed clock ($CLK_{HIGH}$) from the clock divider 120. The HSIF 105 implements a communication protocol using the relatively high speed clock to receive data at a data input terminal (DATA_INP). The HSIF 105 writes the received data to the mirror SRAM 110.

The mirror SRAM 110 is coupled to the HSIF 105, the mirror array 115, and the clock divider 120. The mirror SRAM 110 receives a first reference clock ($CLK_{REF\_1}$) from the clock divider 120. The HSIF 105 writes received data ($DATA_{REC}$) to the mirror SRAM 110. The mirror SRAM 110 is configured to supply data ($DATA_{MIRROR}$) to the mirror array 115 based on the received data from the HSIF 105.

The mirror array 115 is coupled to the mirror SRAM 110 and the reset driver circuitry 135. The mirror array 115 receives mirror data from the mirror SRAM 110. The mirror array 115 stores the mirror data until the mirror SRAM 110 supplies new data. The mirror array 115 receives reset signals from the reset driver circuitry 135. In the example of FIG. 1, the mirror array 115 includes a first example module 140 and a second example module 145. In the example of FIG. 1, the modules 140 and 145 are illustrated, however the mirror array 115 is configured to include a plurality of modules. In some examples, the plurality of modules of the mirror array 115 depends on a resolution of the DMD 100. In other examples, the plurality of modules of the mirror array 115 depends on a number of rows of mirrors and/or columns of the mirror array 115. The mirror array 115 modulates light by positioning micro-mirrors of the modules 140 and 145. The data from the mirror SRAM 110 determines the positioning of individual micro-mirrors. The reset signals from the reset driver circuitry 135 determine timing of changes in the positioning of all micro-mirrors of one of the modules 140 or 145.

The modules 140 and 145 are coupled to the mirror SRAM 110 and the reset driver circuitry 135. In the example of FIG. 1, the first module 140 includes a first example micro-mirror cell 150 and a second example micro-mirror cell 155. In the example of FIG. 1, the micro-mirror cells 150 and 155 are illustrated, however the first module 140 is configured to include any plurality of micro-mirror cells. In some examples, the plurality of micro-mirror cells of the first module 140 depends on a resolution of the DMD 100. In other examples, the plurality of micro-mirror cells of the first module 140 depends on a number of rows of mirrors and/or columns of the mirror array 115. In some examples, the reset driver circuitry 135 supplies the reset signals to each module after the mirror SRAM 110 finishes writing to all micro-mirror cells (e.g., the micro-mirror cells 150 and 155) of any given module (e.g., the modules 140 and 145). In such examples, the reset driver circuitry 135 needs to generate the reset signals at speeds approximately equal to a time the mirror SRAM 110 needs to finish writing to all micro-mirror cells.

The first micro-mirror cell 150 is coupled to the mirror SRAM 110 and the reset driver circuitry 135. In the example of FIG. 1, the first micro-mirror cell 150 includes an example micro-mirror 160, a first example mirror state 165, a second example mirror state 170, an example bit cell 175, a first example electrode ($V_{C1}$) 180, and a second example electrode ($V_{C2}$) 185. The first micro-mirror cell 150 stores data from the mirror SRAM 110 in the bit cell 175. The first micro-mirror cell 150 modifies voltages of the micro-mirror 160 and the electrodes 180 and 185 based on the data stored in the bit cell 175 and reset signals from the reset driver circuitry 135. For example, the mirror data of the bit cell 175 may cause the micro-mirror 160 to transition from the first mirror state 165 to the second mirror state 170 when the reset driver circuitry 135 supplies reset signals to the module 140.

The micro-mirror 160 is coupled to the reset driver circuitry 135. In some examples, micro-mirrors (e.g., the micro-mirror 160) of a given module are coupled to the reset driver circuitry 135 by multiplexer circuitry (not illustrated). In such examples, multiplexer circuitry couples a reset signal to a given module following the mirror SRAM 110 writing to the given module. In other examples, the reset driver circuitry 135 is individually coupled to micro-mirrors by a given module. The reset driver circuitry 135 supplies a mirror reset signal ($V_{Mirror}$) to the micro-mirror 160. The mirror reset signal determines a voltage of the micro-mirror 160. The micro-mirror 160 may be positioned in one of the mirror states 165 or 170 based on a voltage of the micro-mirror 160 and voltages of the electrodes 180 and 185. Example positioning of the micro-mirror 160 is described in further detail in connection with FIG. 6, below.

The bit cell 175 is coupled to the mirror SRAM 110, the reset driver circuitry 135, and the electrodes 180 and 185. The bit cell 175 stores data from the mirror SRAM 110. The bit cell 175 sets one of the electrodes 180 or 185 to a voltage of an electrode reset signal ($V_{BSA}$) from the reset driver circuitry 135 based on data from the SRAM 110. In some examples, the mirror SRAM 110 sets the bit cell 175 to a first logic state (e.g., a digital high or a digital low) to cause a reset signal from the reset driver circuitry 135 to be coupled to a first one of the electrodes 180 or 185. In such examples, the mirror SRAM 110 sets the bit cell 175 to a second logic state (e.g., a digital high or a digital low) to cause the reset signal from the reset driver circuitry 135 to be coupled to a second one of the electrodes 180 or 185.

The clock divider 120 is coupled to the HSIF 105, the mirror SRAM 110, the LSIF 125, and the reset controller circuitry 130. The clock divider 120 receives one or more clock signals from an external source (not illustrated for simplicity), such as an oscillator. The clock divider 120 divides the one or more clock signals to generate the relatively high-speed clock, the first reference clock ($CLK_{REF\_1}$), a relatively low-speed clock ($CLK_{LOW}$), and a second reference clock ($CLK_{REF\_2}$). Alternatively, the DMD 100 may be modified in accordance with the teachings disclosed herein for alternate methods of clock generation. The clock divider 120 supplies the relatively high-speed clock to the HSIF 105 to support relatively-high speed communications. The clock divider 120 supplies the first reference clock to the mirror SRAM 110. The clock divider 120 supplies the relatively low-speed clock to the LSIF 125 to support relatively lower-speed communications. The clock divider 120 supplies the second reference clock to the reset controller circuitry 130. The frequencies of the clocks generated by the clock divider 120 depend on the communication protocols of the interfaces 105 and 125, a speed of the mirror SRAM 110, and a speed of the reset controller circuitry 130.

The LSIF 125 is coupled to the clock divider 120 and the reset controller circuitry 130. The LSIF 125 receives the relatively low-speed clock from the clock divider 120. The LSIF 125 implements a communication protocol using the relatively low-speed clock. The LSIF 125 receives off-chip instructions ($INST_{OFF\_CHIP}$) at a reset control terminal (RESET CTRL). In some examples, the LSIF 125 receives the off-chip instructions from an external source, such as an external device, an off-chip device, processor circuitry, etc. In such examples, the external device may supply the off-chip instructions using a communication protocol, such as inter-integrated circuit (I2C), serial peripheral interface (SPI), etc. The LSIF 125 supplies the received off-chip instructions to the reset controller circuitry 130. In some examples, the LSIF 125 writes the received off-chip instructions to a memory location of the reset controller circuitry 130.

The reset controller circuitry 130 is coupled to the clock divider 120, the LSIF 125, and the reset driver circuitry 135. The reset controller circuitry 130 receives the second reference clock from the clock divider 120. The reset controller circuitry 130 receives the off-chip instructions from the LSIF 125. The reset controller circuitry 130 stores instructions in a local memory (illustrated in FIGS. 2 and 3, below). The instructions stored in the reset controller circuitry 130 are referred to as on-chip instructions. The reset controller circuitry 130 generates reference reset signals ($W_{MIRROR}$ and $W_{BSA}$) based on the off-chip instructions and/or the on-chip instructions. Alternatively, the reset controller circuitry 130 may modified in accordance with the teachings disclosed herein to generate any plurality of reference reset signals. The reset controller circuitry 130 supplies the reference reset signals to the reset driver circuitry 135. Examples of the reset controller circuitry 130 are illustrated and discussed in connection with FIGS. 2 and 3, below. Example instructions are illustrated and discussed in connection with FIG. 4, below.

The reset driver circuitry 135 is coupled to the mirror array 115 and the reset controller circuitry 130. The reset driver circuitry 135 receives the reference reset signals from the reset controller circuitry 130. The reset driver circuitry 135 generates a mirror reset signal ($V_{MIRROR}$) and an electrode reset signal ($V_{BSA}$) by increasing a drive strength of the reference reset signals from the reset controller circuitry 130. In some examples, the reset driver circuitry 135 may include an amplifier to increase a drive strength and voltage of the first reset signal to generate the mirror reset signal. In such examples, the reset driver circuitry 135 may include an amplifier to increase a drive strength and voltage of the second reset signal to generate the electrode reset signal. In other examples, the reset driver circuitry 135 includes a plurality of drivers to increase voltages of the reference reset signals from the reset controller circuitry 130 to generate the mirror reset signal and the electrode reset signal. The reset driver circuitry 135 supplies the mirror reset signal and the bias reset signal to the mirror array 115.

In the example of FIG. 1, the reset controller circuitry 130 is implemented in the DMD 100. Alternatively, the reset controller circuitry 130 may be implemented in other time sensitive applications, which would benefit from relatively high-speed generation of reset waveforms. For example, the reset controller circuitry 130 may be included in other SLMs. In such an example, the reset controller circuitry 130 supplies reset waveforms as portions of an SLM are configured, such as writing to modules, cells, bits, pixels, etc. Advantageously, the reset controller circuitry 130 may be modified, in accordance with the teachings disclosed herein, to perform instructions specific to reset waveforms.

Figure 2:
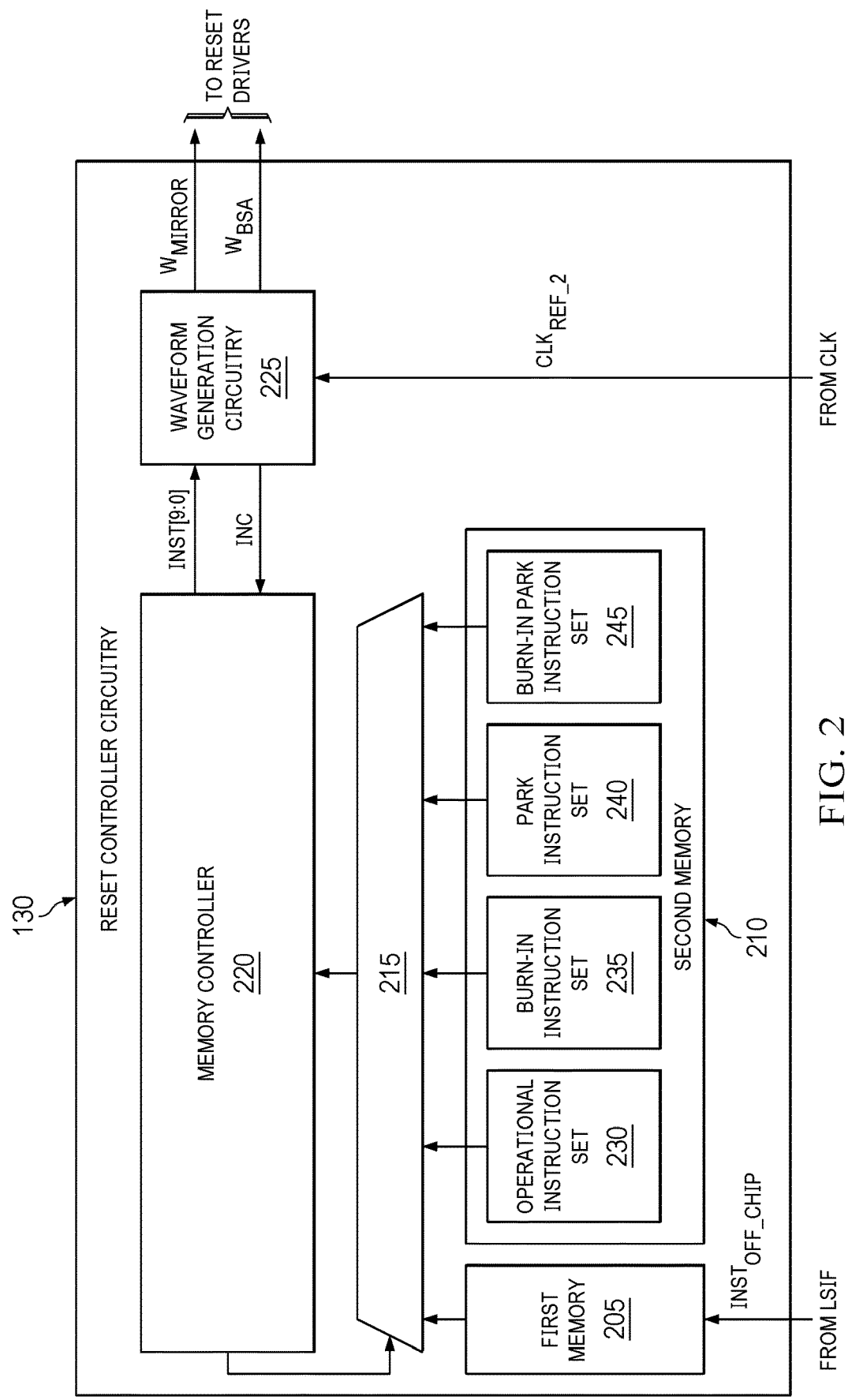
FIG. 2 is a schematic diagram of a first example of the reset controller circuitry of FIG. 1 including waveform generation circuitry configured to generate reset signals.

FIG. 2 is a schematic diagram of the reset controller circuitry 130 of FIG. 1. In the example of FIG. 2, the reset controller circuitry 130 includes a first example memory 205, a second example memory 210, an example multiplexer 215, an example memory controller 220, and example waveform generation circuitry 225. The reset controller circuitry 130 receives the second reference clock from the clock divider 120 of FIG. 1 and the off-chip instructions from the LSIF 125 of FIG. 1. The reset controller circuitry 130 generates reset signals using the waveform generation circuitry 225. The reset controller circuitry 130 supplies the reset signals to the reset driver circuitry 135 of FIG. 1. In some examples, the memory controller 220 is instantiated by processor circuitry executing memory controller instructions and/or configured to perform operations such as those represented by the flowchart of FIG. 11.

The first memory 205 is coupled to the multiplexer 215. The first memory 205 is configured to receive off-chip instructions. The LSIF 125 supplies the off-chip instructions to the first memory 205. In some examples, the first memory 205 sequentially stores the off-chip instructions. For example, a first instruction receives a lower memory address than a second instruction, when the second instruction was received after the first instruction. In other examples, the first memory 205 stores the off-chip instructions to an arbitrary memory address. For example, the off-chip instructions may include an instruction address that defines a location in the first memory 205.

The first memory 205 sequentially supplies the off-chip instructions, by the multiplexer 215, to the memory controller 220. For example, the first memory 205 supplies a first instruction received at a first time to the memory controller 220 followed by a second instruction received at a second time, when the second time follows the first time. In the example of FIG. 2, the first memory 205 is an SRAM. Alternatively, the first memory 205 may be a buffer, first in first out (FIFO) buffer, etc. Advantageously, the sequential supply of off-chip instructions by the first memory 205 allows for off-chip instructions to construct relatively complex reset signals.

The second memory 210 is coupled to the multiplexer 215. In the example of FIG. 2, the second memory 210 includes an example operational instruction set 230, an example burn-in instruction set 235, an example park instruction set 240, and an example burn-in park instruction set 245. The instruction sets 230-245 are a plurality of hard-coded instructions (illustrated in connection with FIG. 4, below) configured to generate predefined waveforms. The instructions of the instruction sets 230-245 are referred to as on-chip instructions. The second memory 210 supplies the instruction sets 230-245 to the memory controller 220 based on the multiplexer 215. For example, the multiplexer 215 may be configured to supply one of the instruction sets 230-245 to the memory controller 220. In the example of FIG. 2, the second memory is a read only memory (ROM). Alternatively, the second memory may be an alternate type of memory or storage medium configured to store the instruction sets 230-245.

The operational instruction set 230 is a plurality of instructions that when supplied to the memory controller 220 cause the waveform generation circuitry 225 to generate a first set of reset signals. The first set of reset signals correspond to normal reset operations, such as during normal operations of the DMD 100 of FIG. 1. For example, the multiplexer 215 supplies the operational instruction set 230 to the memory controller 220 to cause the mirror array 115 of FIG. 1 to latch mirror data of the bit cell 175 of FIG. 1.

The burn-in instruction set 235 is a plurality of instructions that when supplied to the memory controller 220 cause the waveform generation circuitry 225 to generate a second set of reset signals. The second set of reset signals correspond to reset operations that occur during a burn-in process of manufacturing the DMD 100. The burn-in process is a series of tests that occur during the manufacturing of the DMD 100. During the burn-in process the multiplexer 215 is configured to supply the burn-in instruction set 235 to the memory controller 220.

The park instruction set 240 is a plurality of instructions that when supplied to the memory controller 220 cause the waveform generation circuitry 225 to generate a third mirror set of reset signals. The third set of reset signals correspond to reset operations that occur as part of a power down sequence and/or a standby mode of the DMD 100. The third waveforms cause mirrors of the mirror array 115 of FIG. 1 to a known position between the mirror states 165 or 170 of FIG. 1. For example, the park instruction set 240 may cause the mirror array 115 to position all micro-mirrors of the mirror array 115 to the first mirror state 165.

The burn-in park instruction set 245 is a plurality of instructions that when supplied to the memory controller 220 cause the waveform generation circuitry 225 to generate a fourth set of reset signals. The fourth set of reset signals correspond to reset operations that occur as part of a power down sequence and/or a standby mode of the DMD 100 during the burn-in process of manufacturing. The fourth set of reset signals cause mirrors of the mirror array 115 of FIG. 1 to a known one of the mirror states 165 or 170. For example, the burn-in park instruction set 245 causes the mirror array 115 to position all micro-mirrors in the first mirror state 165.

In the example of FIG. 2, the second memory 210 includes the instruction sets 230-245. Alternatively, the second memory 210 may be modified to include alternate instruction sets, specific to alternate implementations of the reset controller circuitry 130. For example, the second memory 210 may include an instruction set to generate reset signals, which clear values stored in cells, modules, bits, pixels, etc. In another example, the second memory 210 may include instruction sets to reset an SLM to specific states, such as power-on, power-down, reset, stand-by, etc.

The multiplexer 215 is coupled to the memories 205 and 210 and the memory controller 220. The memory controller 220 controls the multiplexer 215. The multiplexer 215 is configured to couple one of the memories 205 and/or 210 to the memory controller 220. The multiplexer 215 supplies instructions from one of the memories 205 and/or 210 to the memory controller 220.

The memory controller 220 is coupled to the multiplexer 215 and the waveform generation circuitry 225. The memory controller 220 receives the instructions from the multiplexer 215. The memory controller 220 configures the multiplexer 215 to supply the instructions from one of the memories 205 or 210. In some examples, the memory controller 220 may configure to the multiplexer 215 to supply one of the instruction sets 230-245 to the memory controller 220 based on a mode of operation. In such an example, the memory controller 220 accesses the operational instruction set 230 when the DMD 100 is in a normal operational mode of operation or the park instruction set 240 during a power down sequence of the DMD 100. The memory controller 220 may prioritize instructions from the first memory 205 by supplying all instructions stored in the first memory 205 as they are received. In some examples, the memory controller 220 periodically configure the multiplexer 215 to access the first memory 205 to determine whether there are any instructions from the LSIF 125. In such examples, the memory controller 220 determines all instructions of the first memory 205 have been supplied based on an indication from the first memory 205 that there are no instructions. In other examples, the memory controller 220 determines all instructions of a set of instructions in the first memory 205 have been supplied in response to receiving an escape instruction. For example, the escape instruction, from the LSIF 125, indicates that a previous instruction was a last instruction of an instruction set in the first memory 205. In such an example, the LSIF 125 receives the escape instruction from an external source after a final instruction to be provided to the memory controller 220. Alternatively, the reset controller circuitry 130 may be modified, in accordance with the teachings disclosed herein, to generate the escape instruction.

The memory controller 220 supplies the instructions to the waveform generation circuitry 225. The memory controller 220 receives an increment indicator (INC) from the waveform generation circuitry 225. The memory controller 220 supplies a subsequent instruction to the waveform generation circuitry 225 in response to the increment indicator. In some examples, the memory controller 220 may provide a subsequent instruction of one of the instruction sets 230-245 in response to the increment indicator. Such instructions may be referred to as on-chip instructions. In other examples, the memory controller 220 provides instructions from the first memory 205 as the subsequent instruction. Such instructions may be referred to as off-chip instructions. The memory controller 220 prioritizes instructions based on which instructions are supplied in response to the subsequent instruction. For example, the memory controller 220 may prioritize off-chip instructions by supplying any instructions in the first memory 205 in response to the increment indicator. Advantageously, the memory controller 220 may be configured to prioritize off-chip commands of the first memory 205 or on-chip commands of the second memory 210.

The waveform generation circuitry 225 is coupled to the memory controller 220. The waveform generation circuitry 225 receives the second reference clock from the clock divider 120. The waveform generation circuitry 225 generates the reset signals based on the instructions from the memory controller 220 and the second reference clock. The waveform generation circuitry 225 supplies the increment indicator to the memory controller 220 in response to performance of the instruction. In the example of FIG. 2, the waveform generation circuitry 225 supplies the first and second reset signals to the reset driver circuitry 135. Example instructions are discussed in further detail in FIG. 4, below. An example of the waveform generation circuitry 225 is described in further detail in FIG. 5, below. Alternatively, the waveform generation circuitry 225 may be implemented as a finite-state-machine (FSM) configured to generate reset signals based on states defined by instructions.

Figure 3:
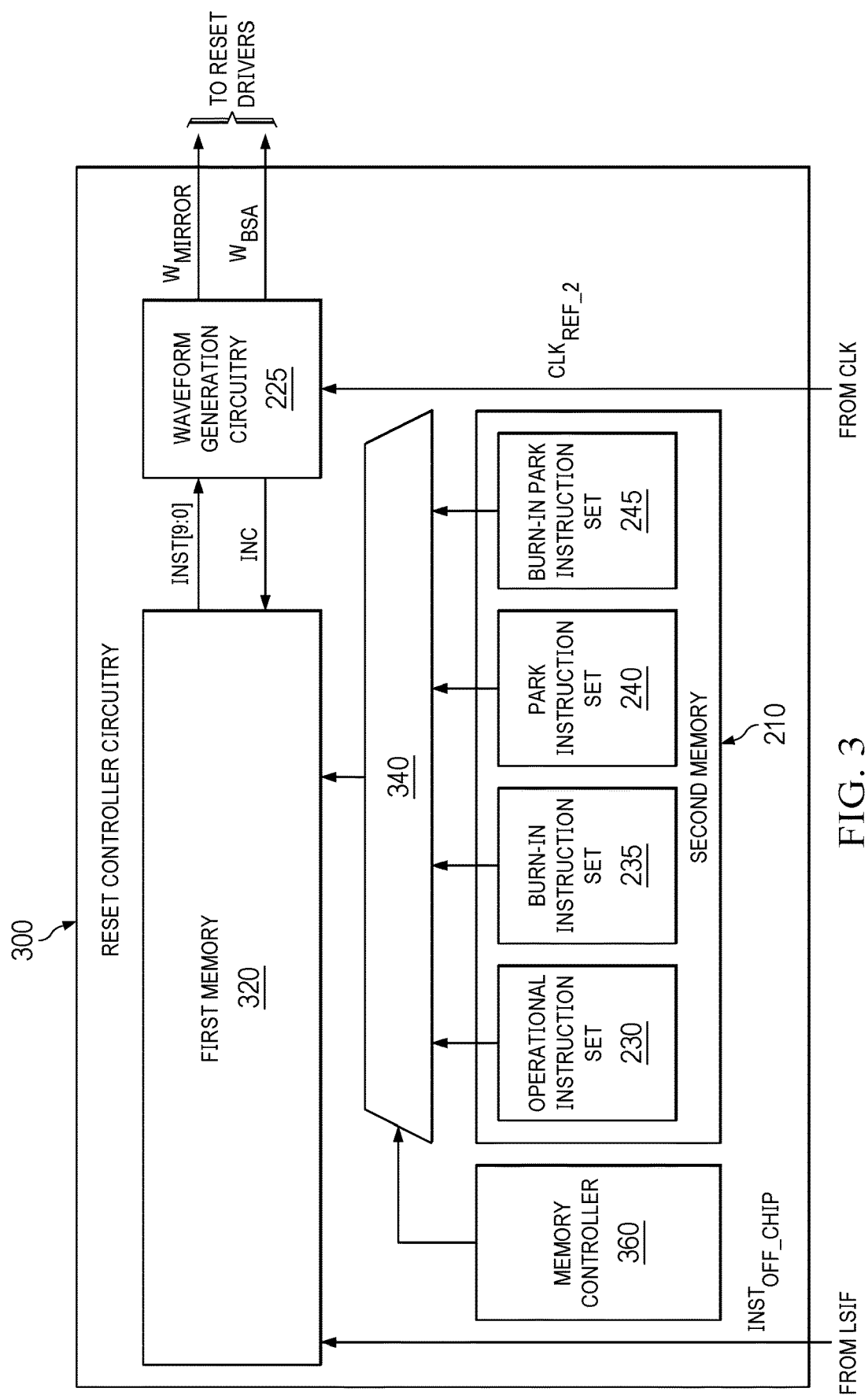
FIG. 3 is a schematic diagram of a second example of the reset controller circuitry of FIGS. 1 and 2 including the waveform generation circuitry of FIG. 2.

FIG. 3 is schematic diagram of another example of the reset controller circuitry 130 of FIGS. 1 and 2. In the example of FIG. 3, example reset controller circuitry 300 includes the second memory 210 of FIG. 2, the waveform generation circuitry 225 of FIG. 2, an example first memory 320, an example multiplexer 340, and an example memory controller 360. The reset controller circuitry 300 is configured to be coupled to the clock divider 120 of FIG. 1, the LSIF 125 of FIG. 1, and the reset driver circuitry 135 of FIG. 1. The reset controller circuitry 300 receives the second reference clock from the clock divider 120 and the off-chip instructions from the LSIF 125. The reset controller circuitry 300 generates the first and second reset signals using the waveform generation circuitry 225. The reset controller circuitry 300 supplies the reset signals to the reset driver circuitry 135.

The first memory 320 is coupled to the LSIF 125, the waveform generation circuitry 225, and the multiplexer 340. The first memory 320 receives the off-chip instructions from the LSIF 125. The first memory 320 receives on-chip instructions from the second memory 210 by the multiplexer 340. The first memory 320 supplies instructions to the waveform generation circuitry 225. The first memory 320 supplies subsequent instructions to the waveform generation circuitry 225 in response to the increment indicator from the waveform generation circuitry 225. The first memory 320 may be configured to prioritize off-chip instructions or on-chip instructions by modifying an order in which instructions are supplied to the waveform generation circuitry 225. For example, the first memory 320 prioritizes off-chip instructions by providing off-chip instructions before instructions of the instruction sets 230-245 of FIG. 2. In such an example, the first memory 320 may use a FIFO buffer to supply instructions to the waveform generation circuitry 225 and proceed to instructions of one of the instruction sets 230-245 when the FIFO buffer is empty. In the example of FIG. 3, the first memory 320 is an SRAM. Alternatively, the first memory 320 may be an alternate type of programable memory or storage medium.

The multiplexer 340 is coupled to the memories 210 and 320 and the memory controller 360. The multiplexer 340 supplies instruction sets 230-245 to the first memory 320 based on the memory controller 360.

The memory controller 360 is coupled to the multiplexer 340. The memory controller 360 controls the multiplexer 340 based on a mode of operation of the DMD 100 of FIG. 1. For example, during a normal mode of operation, the memory controller 360 configures the multiplexer 340 to supply the operational instruction set 230 to the first memory 320. In another example, during a power down or a standby mode of operation, the memory controller 360 configures the multiplexer 340 to supply the park instructions set 240 to the first memory 320. In some examples, the memory controller 360 is instantiated by processor circuitry executing memory controller instructions and/or configured to perform operations such as those represented by the flowchart of FIG. 11. In such examples, the memory controller 360 determines the mode of operation of the DMD 100 based on an indicator from such processor circuitry. In other examples, the memory controller 360 determines the mode of operation of the DMD 100 based on operations of the mirror SRAM 110 of FIG. 1 or the HISF 105 of FIG. 1. In such examples, the mirror SRAM 110 of the HSIF 105 may be coupled to the memory controller 360. For examples, the mirror SRAM 110 may supply predetermined data to mirror cells (e.g., the mirror cells 150 and 155) based on a mode of operation in response to a command from the HSIF 105. In such an example, the HSIF 105 may supply a command to set the DMD 100 to a normal mode, standby mode, etc.

Figure 4:
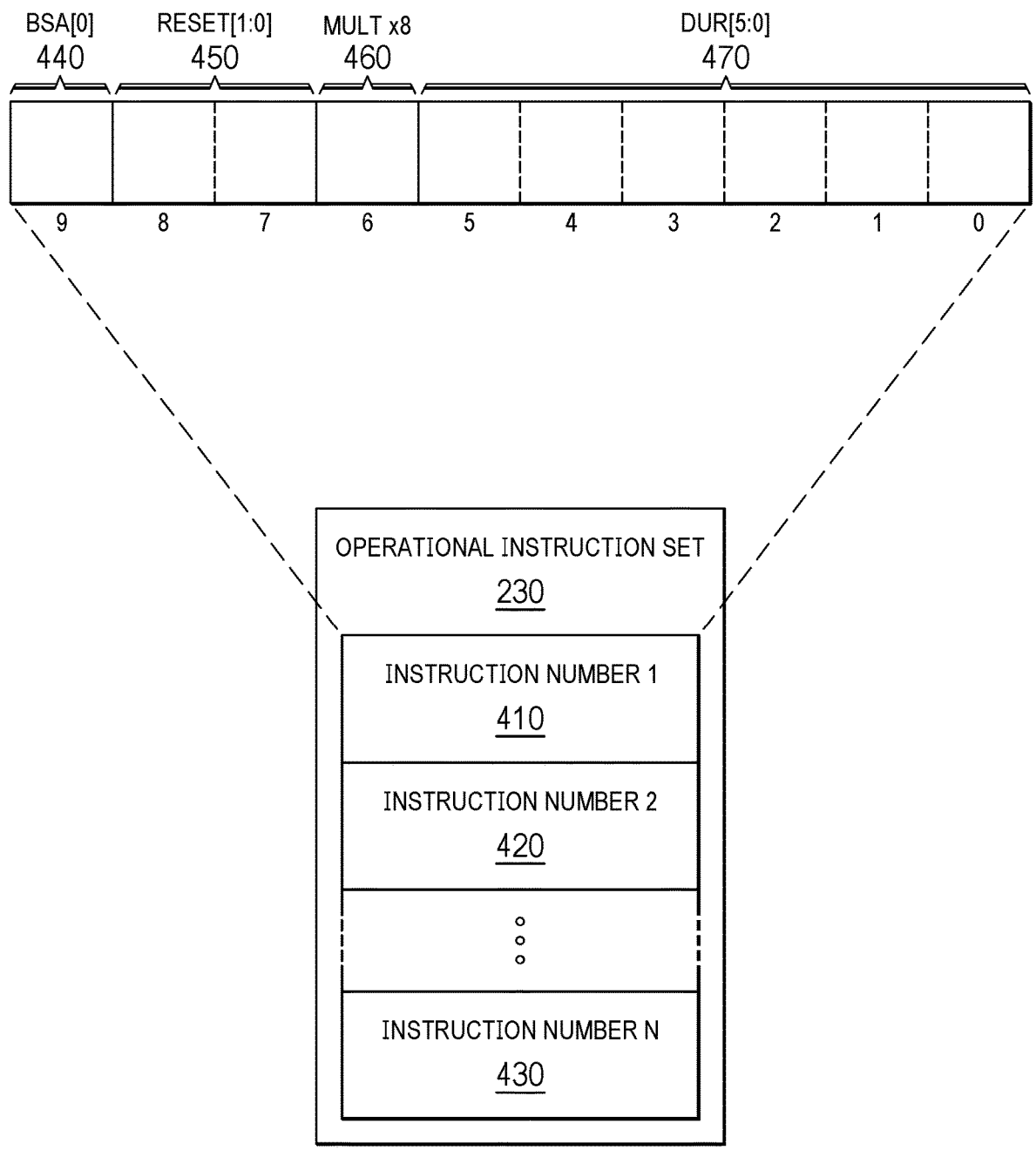
FIG. 4 is a block diagram of an example instruction set including instructions configured to cause the waveform generation circuitry to generate relatively complex reset signals.

FIG. 4 is a schematic illustration of the operational instruction set 230 of FIGS. 2 and 3. Alternatively, the instruction sets 235-245 of FIGS. 2 and 3 are structured similarly to as the operational instruction set 230 is illustrated in FIG. 4. In some examples, the instruction sets 230-245 may include a different number of instructions, sequence of instructions, and/or location of instructions. In such examples, an escape instruction identifies a final instruction of the instruction sets 230-245. For example, the escape instruction follows the final instruction of one of the instruction sets 230-245 to identify an end to a reset waveform generation of the one of the instruction sets 230-245.

In the example of FIG. 4, the operational instruction set 230 includes a first example instruction 410, a second example instruction 420, and a third example instruction 430. In the example of FIG. 4, the instructions 410-430 are illustrated, however the operational instruction set 230 is configured to include any plurality of instructions. In some examples, a number of the plurality of instructions depends on an operation resulting from generation of reset waveforms. For example, the operational instruction set 230 may include five instructions to cause reset operations, such as modifying positioning of a micro-mirror (e.g., the micro-mirror 160 of FIG. 1). the In other examples, the number of the plurality of instructions depends on the capabilities of the waveform generations circuitry 225 of FIGS. 2 and 3. The operational instruction set 230 is a portion of the second memory 210 of FIGS. 2 and 3 configured to store the instructions 410-430. The instructions 410-430 of the operational instruction set 230 are configured to cause the waveform generation circuitry 225 to generate reset signals corresponding to a normal mode of operation of the DMD 100. Although in the example of FIG. 4, the operational instruction set 230 includes instructions 410-430, the operational instruction set 230 may include any plurality of instructions.

The first instruction 410 is a multi-bit instruction configured to cause the waveform generation circuitry 225 to set the mirror reset signal and the electrode reset signal to voltages for a specified duration of time. In the example of FIG. 4, the first instruction 410 includes an example bi-level reset indicator (BSA[0]) 440, an example multi-level reset indicator (RESET[1:0]) 450, an example coarse duration indicator (MULT[0]) 460, and an example fine duration indicator (DUR[5:0]) 470. The first instruction 410 is a ten bit value representative of the mirror reset signal and the electrode reset signal for a given duration of time.

In the example of FIG. 4, the bi-level reset indicator 440 is a one bit value. The bi-level reset indicator 440 indicates whether the electrode reset signal is to be offset by a direct current (DC) bias voltage. For example, the bi-level reset indicator 440 causes the waveform generation circuitry 225 to set the electrode reset signal equal to a first reference voltage of approximately 10 volts (V) when the bi-level reset indicator 440 is set to a logical one (e.g., a logic high or a reference potential). In such an example, the bi-level reset indicator 440 causes the waveform generation circuitry 225 to set the electrode reset signal equal to a second reference voltage of approximately 1 volt (V) when the bi-level reset indicator 440 is set to a logic low (e.g., a logical zero or the common potential). A single bit is used for the bi-level reset indicator 440 to represent two possible states of the second reset signal. Alternatively, the bi-level reset indicator 440 may be multiple bits to represent multiple states of the second reset signal. For example, the bi-level reset indicator 440 may be two bits when the waveform generation circuitry 225 may set the voltage of the electrode reset signal to four different voltages.

The multi-level reset indicator 450 is a two bit value. The multi-level reset indicator 450 indicates a state of the mirror reset signal. Accordingly, the mirror reset signal may be one of four possible states. The states represented by the multi-level reset indicator 450 correspond to different voltages of the mirror reset signal. For example, the multi-level reset indicator 450 causes the waveform generation circuitry 225 to set the mirror reset signal equal to a first voltage when both bits of the multi-level reset indicator 450 are logical ones or equal to a second voltage when both bits of the multi-level reset indicator 450 are logical zeros. In such an example, the multi-level reset indicator 450 causes the waveform generation circuitry 225 to set the mirror reset signal equal to a third voltage when a first bit of the multi-level reset indicator 450 is a logical zero and a second bit is a logical one or equal to a fourth voltage when the first bit is a logical one and the second bit a logical zero. Two bits are used for the multi-level reset indicator 450 to represent four possible states of the first reset signal. Alternatively, the multi-level reset indicator 450 may be any number bits to represent any number of states of the mirror reset signal. For example, the multi-level reset indicator 450 may be three bits when the waveform generation circuitry 225 may set the voltage of the mirror reset signal to eight different voltages. An example of the mirror reset signal is illustrated and discussed in connection with FIG. 6, below.

The duration indicators 460 and 470 indicate a number of clock cycles before proceeding to a subsequent instruction. The coarse duration indicator 460 causes the waveform generation circuitry 225 to multiply a number of clock cycles of the fine duration indicator 470 by a scalar value. For example, the waveform generation circuitry 225 counts to the number of cycles identified in the fine duration indicator 470 eight times before proceeding to a subsequent instruction when the coarse duration indicator 460 is a logical one and the scalar value is eight. In such an example, the waveform generation circuitry 225 counts to the number of cycles identified in the fine duration indicator 470 one time before proceeding to a subsequent instruction when the coarse duration indicator 460 is a logical zero, which corresponds to a scalar value of one. A single bit is used for the coarse duration indicator 460 to represent two scalar values (e.g., scalar of eight when logical one and scalar of one when logical zero). Alternatively, the coarse duration indicator 460 may be multiple bits to represent multiple possible scalar values. For example, the coarse duration indicator 460 may be two bits when the waveform generation circuitry 225 may multiply the number of cycles of the fine duration indicator 470 by four different scalar values.

The fine duration indicator 470 is a six bit value. The fine duration indicator 470 represents the number of cycles of the second reference clock to wait before proceeding to a subsequent command. The number of clock cycles represented by the fine duration indicator 470 may be extended by the coarse duration indicator 460, as described above. Although a six bit value represents the fine duration indicator 470, a value of any bit size may be alternatively used in accordance with the teachings disclosed herein.

The timing information of the indicators 460 and 470 allows the LSIF 125 of FIG. 1 to supply the reset controller circuitries 130 and 300 off-chip instructions at speeds less than a duration defined by the indicators 460 and 470. For example, off-chip instructions may modify operations of the waveform generation circuitry 225 after one cycle of the second reference clock. In such an example, the LSIF 125 may use more than one cycle of the relatively low-speed clock to receive an instruction from an external device. In some examples, the LSIF 125 may use 10 mega-Hertz (MHz) SPI communications to receive an off-chip instruction every micro-second, while the DMD 100 of FIG. 1 needs generation of reset signals at relatively higher-speeds. For example, a 10 mega-Hertz SPI communication may take multiple micro-seconds to transmit an instruction set to the LSIF 125. In such an example, the LSIF 125 may supply a complete instruction set to the reset controller circuitry 130 and 300 every one-hundred micro-seconds. The duration indicators 460 and 470 enables the reset controller circuitries 130 and 300 to generate reset waveforms at the relatively higher-speeds, needed by the DMD 100, using off-chip instructions from the LSIF 125. Advantageously, by including timing information, the duration indicators 460 and 470, in the first instruction 410, the LSIF 125 may use relatively lower-speed protocols (e.g., inter-integrated circuit (I2C), serial peripheral interface (SPI), etc.) to receive off-chip instructions.

Figure 5:
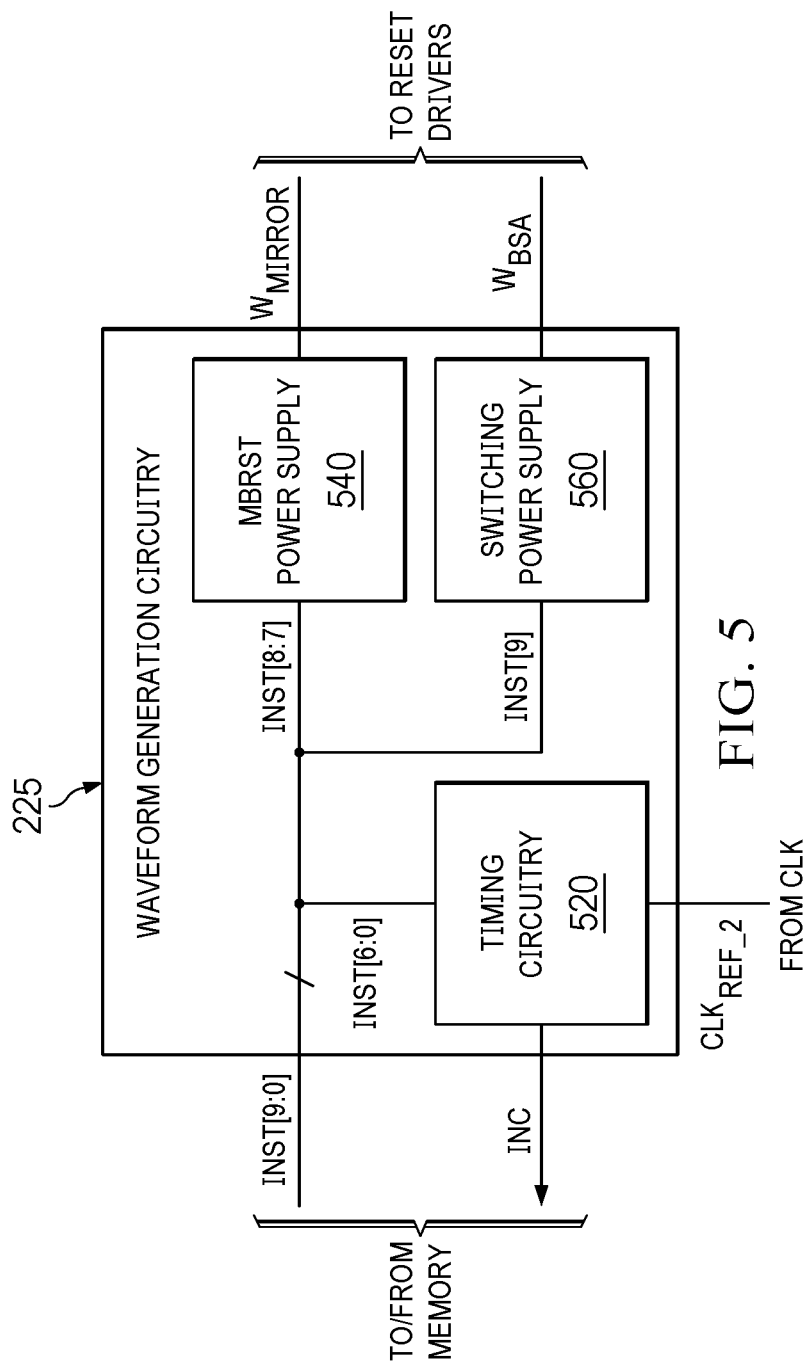
FIG. 5 is a schematic diagram of example waveform generation circuitry of FIGS. 2 and 3 configured to generate reset signals based on the instructions of FIG. 4.

FIG. 5 is a block diagram of an example implementation of the waveform generation circuitry 225 of FIGS. 2 and 3. In the example of FIG. 5, the waveform generation circuitry 225 includes example timing circuitry 520, an example mirror bias reset (MBRST) power supply 540, and an example switching power supply 560. The waveform generation circuitry 225 is configured to generate the mirror reset signal ($W_{MIRROR}$) and the electrode reset signal ($W_{BSA}$) based on the second reference clock from the clock divider 120 of FIG. 1 and the instructions (INST[11:0]) from the memory controller 220 of FIG. 2 or the first memory 320 of FIG. 3. The waveform generation circuitry 225 generates the increment indicator (INC) based on the duration indicators 460 and 470 of FIG. 4 from the instructions and the second reference clock.

The timing circuitry 520 receives the duration indicators 460 and 470 (INST[6:0]) of the instructions and the second reference clock. The timing circuitry 520 determines a number of clock cycles to count based on the duration indicators 460 and 470, as described above. The timing circuitry 520 generates a reference count by counting a number of clock cycles of the second reference clock. The timing circuitry 520 compares the reference count to the number of clock cycles identified by the duration indicators 460 and 470. The timing circuitry 520 resets the reference count in response to receiving a subsequent instruction or generating an increment indicator.

The MBRST power supply 540 receives the multi-level reset indicator 450 of FIG. 4 of the instructions. The MBRST power supply 540 sets a voltage of the mirror reset signal to one of four voltages based on the multi-level reset indicator 450.

The switching power supply 560 receives the bi-level reset indicator 440 of FIG. 4 of the instructions. The switching power supply 560 sets a voltage of the electrode reset signal to one of two voltages based on the bi-level reset indicator 440.

Figure 6:
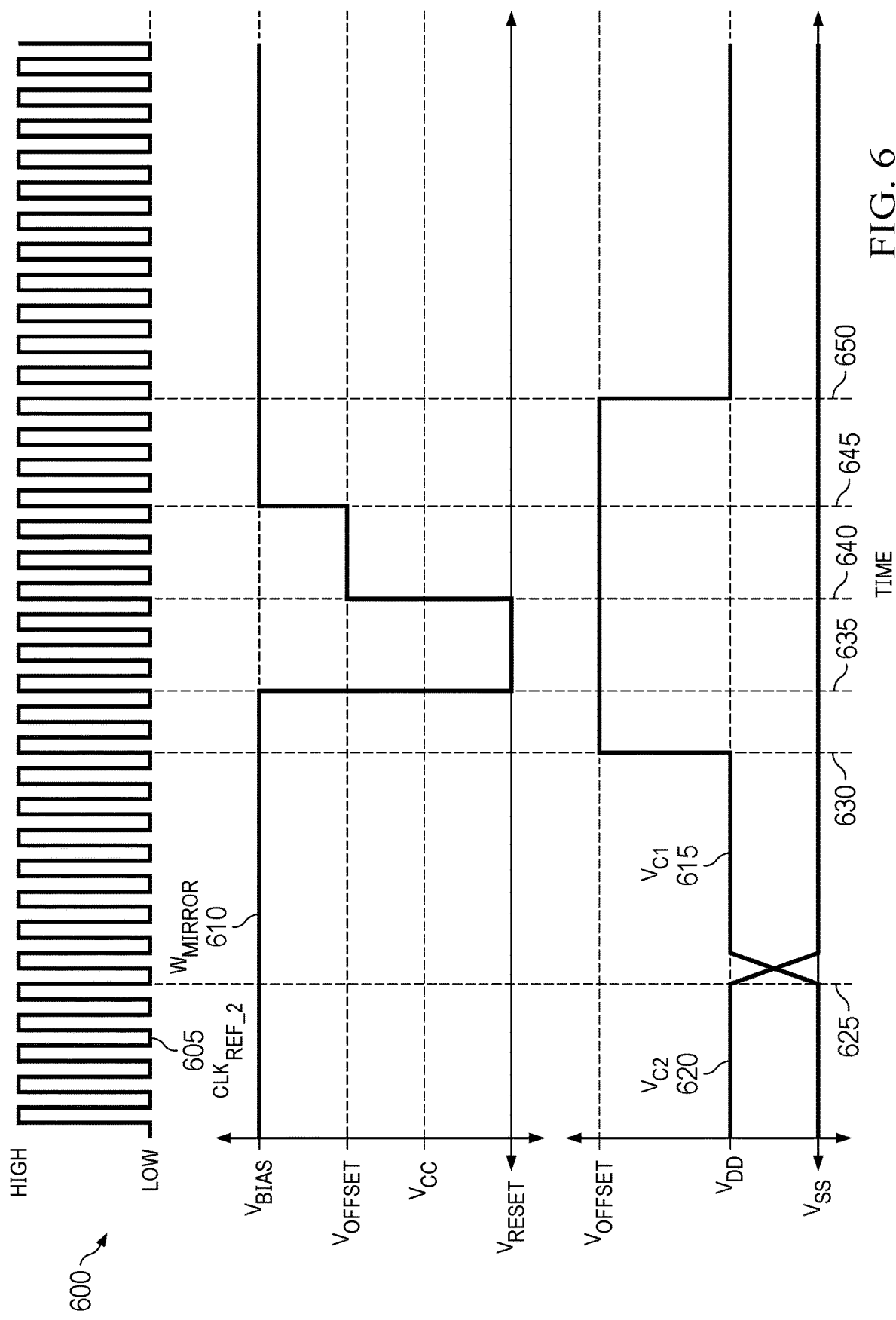
FIG. 6 is an example timing diagram of example reset signals generated by the waveform generation circuitry of FIGS. 2, 3, and 5.

FIG. 6 is a timing diagram 600 of an example operation of the DMD 100 of FIG. 1. In the example of FIG. 6, the timing diagram 600 includes an example reference clock 605, an example mirror voltage 610, a first example electrode voltage 615, and a second example electrode voltage 620. In the example of FIG. 6, the example operation illustrates a transition of the micro-mirror 160 of FIG. 1 from the second mirror state 170 of FIG. 1 to the first mirror state 165 of FIG. 1.

The reference clock 605 represents the second reference clock from the clock divider 120 of FIG. 1. The reference clock 605 is supplied to the reset controller circuitry 130 of FIGS. 1 and 2. The mirror voltage 610 represents a voltage of the micro-mirror 160 which is set based on the first reset signal from the waveform generation circuitry 225 of FIGS. 2, 3, and 5. The first electrode voltage 615 represents a voltage of the first electrode 180 of FIG. 1. The second electrode voltage 620 represents a voltage of the second electrode 185 of FIG. 1. The electrode voltages 615 and 620 may be offset by the electrode reset signal.

At a first time 625, the first electrode voltage 615 begins to transition from a source supply voltage ($V_{SS}$) to a supply voltage ($V_{DD}$). At the first time 625, the second electrode voltage 620 begins to transition from the supply voltage to the source supply voltage. Such a transition in the electrode voltages 615 and 620 is in response to the mirror SRAM 110 modifying data stored in the bit cell 175.

At a second time 630, the first electrode voltage 615 is set to a voltage approximately equal to the supply voltage plus the bias voltage, which is approximately equal to a voltage of the mirror voltage 610. At the second time 630, the waveform generation circuitry 225 receives an instruction including a bi-level reset indicator 440 that causes the switching power supply 560 to offset the second reset signal by an offset voltage ($V_{OFFSET}$). At the second time 630, a potential difference between the mirror voltage 610 and the first electrode voltage 615 is decreased.

At a third time 635, the mirror voltage 610 transitions from a bias voltage ($V_{BIAS}$) to a reset voltage ($V_{RESET}$). At the third time 635, the waveform generation circuitry 225 receives an instruction with the multi-level reset indicator 450 of FIG. 4 to cause the mirror voltage 610 to be set to the reset voltage. Such a state represented by the multi-level reset indicator 450 may be referred to as a reset state. At the third time 635, a voltage difference between the mirror voltage 610 and the first electrode voltage 615 causes a physical attraction between the micro-mirror 160 and the first electrode 180. Beginning at the third time 635, the physical attraction, resulting from the potential difference, causes mechanical energy to begin accumulating in the micro-mirror 160. Although at the third time 635, mechanical energy is being stored in the micro-mirror 160, the potential difference between the voltages 610 and 615 prevent the micro-mirror 160 from moving. In some examples, the micro-mirror 160 includes a spring-tip that begins to compress in response to the physical attraction at the third time 635. In such examples, compression of the spring-tip stores the mechanical energy.

At a fourth time 640, the mirror voltage 610 transitions from the reset voltage to the offset voltage in response to the waveform generation circuitry 225 receiving an instruction with the multi-level reset indicator 450 to cause the mirror voltage 610 to be set to the offset voltage. Such a state represented by the multi-level reset indicator 450 may be referred to as an offset state. At the fourth time 640, a voltage difference between the mirror voltage 610 and the first electrode voltage 615 is approximately zero volts. At the fourth time 640, the mechanical energy accumulated in the micro-mirror 160 between the times 635 and 640 is released, causing the micro-mirror 160 to begin a mechanical transition from the second mirror state 170 to the first mirror state 165. Advantageously, physical attraction between the micro-mirror 160 and the first electrode 180 is reduced in response to the mirror voltage 610 and the electrode voltage 615 being approximately equal.

At a fifth time 645, the mirror voltage 610 transitions to the bias voltage in response to the waveform generation circuitry 225 receiving an instruction with the multi-level reset indicator 450 to cause the mirror voltage 610 to be set to the bias voltage. By the fifth time 645, the micro-mirror 160 has substantively transitioned towards the first mirror state 165. At the fifth time 645, the mirror voltage 610 may return to the bias voltage without the micro-mirror 160 being attracted to the first electrode 180. Following the fifth time 645, the micro-mirror 160 releases any access mechanical energy which was accumulated between times 635 and 640.

At a sixth time 650, the first electrode voltage 615 transitions to the supply voltage in response to the waveform generation circuitry 225 receiving an instruction with the bi-level reset indicator 440 to remove the DC offset from the first electrode voltage 615. Following the sixth time 650, the mirror SRAM 110 may modify the bit cell 175 to position the micro-mirror 160 as needed.

In the example of FIG. 6, the waveform generation circuitry 225 modifies the voltages 610 and 615 after a plurality of cycles of the reference clock 605. Alternatively, the duration indicators 460 and 470 of instructions at times 630-650 may be modified to increase or decreases a number of cycles of the reference clock 605 between instructions.

Advantageously, the waveform generation circuitry 225 may modify voltages of the reset signals based on clock cycles of the reference clock 605.

In some examples, indicators (e.g., indicators 440-470) of instructions (e.g., instructions 410-430) may be modified to decrease times between transitions of the voltages 610 and 615. For example, decreasing values of the duration indicators 460 and 470 may increase a speed of the reset signals. In other examples, indicators (e.g., indicators 440-470) of instructions (e.g., instructions 410-430) may be modified to create additional potential voltages of reset signals. For example, the bi-level reset indicator 440 may be increased to two bits to allow the electrode voltages 615 and 620 to be set to one of four potential voltages. In such an example, the electrode reset signal includes additional potential voltage levels compared to a single bit for the bi-level address indicator 440. Advantageously, the indicators 440-470 may be modified to modify control of the reset signals.

Figure 7A:
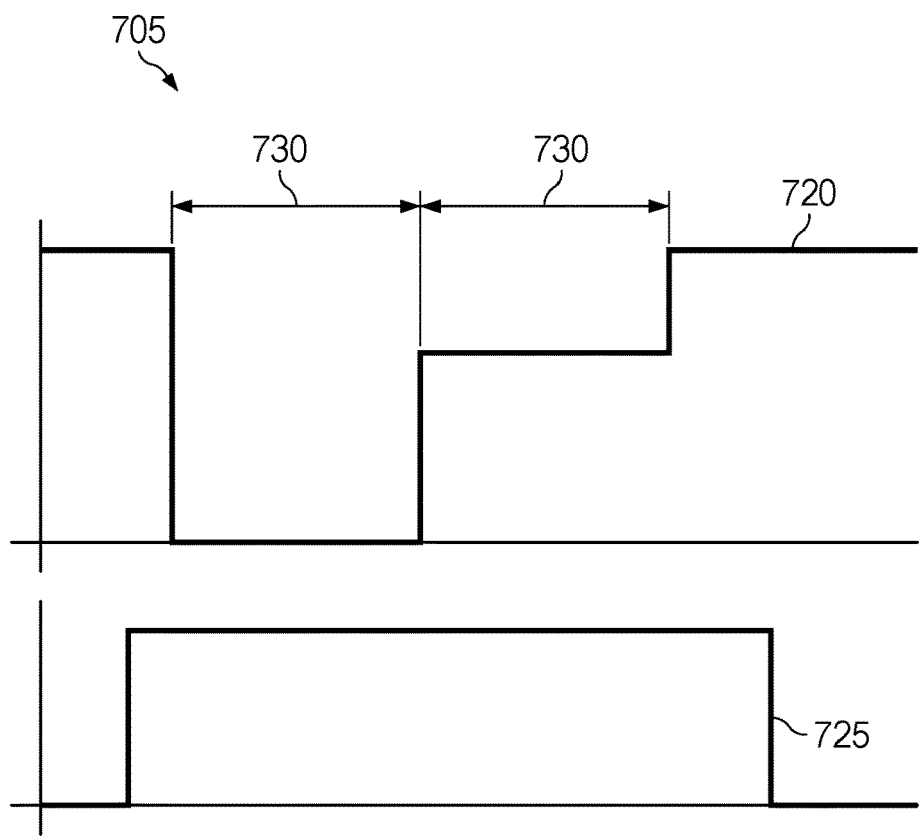
FIGS. 7A-7C are example timing diagrams of example reset signals generated by the waveform generation circuitry of FIGS. 2, 3, and 5.
Figure 7B:
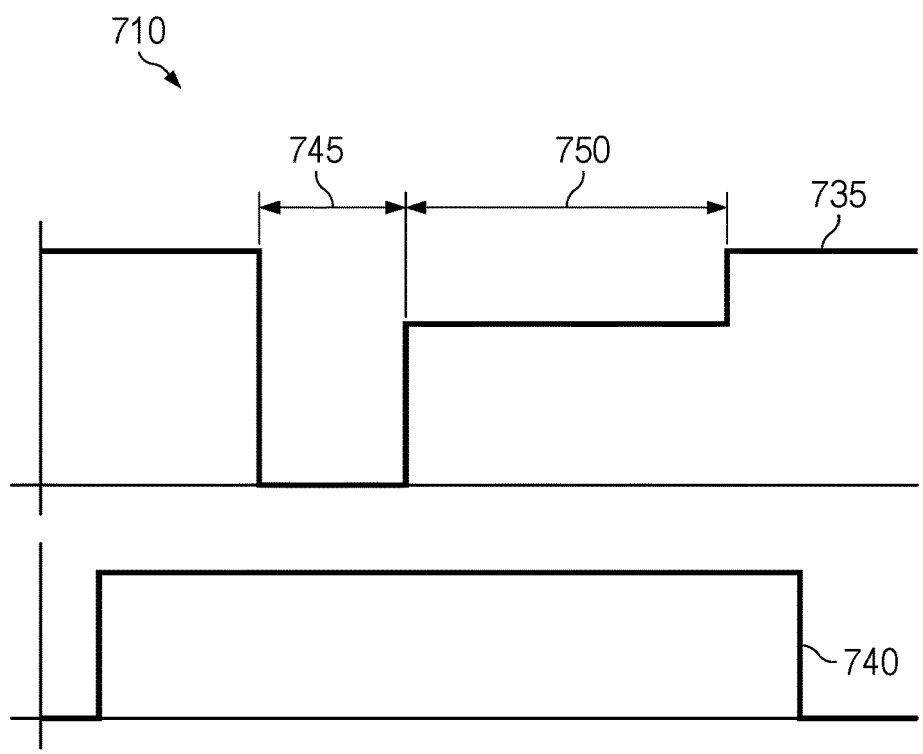
Figure 7C:
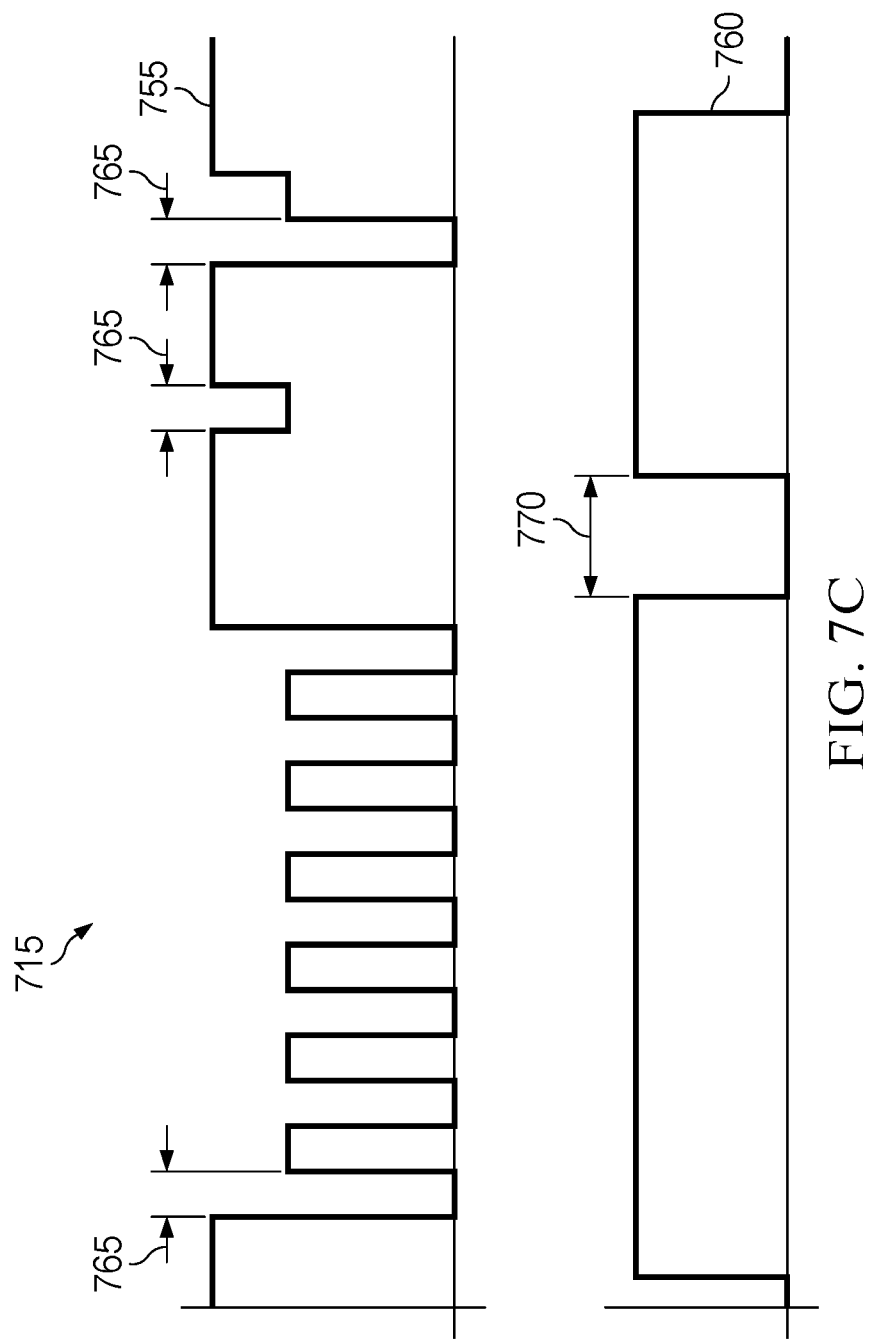

FIGS. 7A-7C are example timing diagrams of example reset signals generated by the waveform generation circuitry 225 of FIGS. 2, 3, and 5. The example of FIGS. 7A-7C, include a first example timing diagram 705, a second example timing diagram 710, and a third example timing diagram 715. The timing diagrams 705-715 illustrate example operations of the waveform generation circuitry 225 in response to different instructions.

In the example of FIG. 7A, the first timing diagram 705 includes a first example mirror voltage 720 and a first example electrode voltage 725. The first timing diagram 705 illustrates example normal reset operations of the waveform generation circuitry 225, using off-chip instructions without the duration indicators 460 and 470 of FIG. 4. For example, the waveform generation circuitry 225 is only supplied instructions from the first memory 205 of FIG. 2. In such an example, the waveform generation circuitry 225 is supplied instructions as instructions are received from the LSIF 125 of FIG. 1.

The first mirror voltage 720 represents the mirror reset signal from the waveform generation circuitry 225. The first electrode voltage 725 represents the electrode reset signal from the waveform generation circuitry 225.

In the example of FIG. 7A, the waveform generation circuitry 225 may modify the first mirror voltage 720 after a first example duration 730. The first duration 730 is a duration of time that is needed for the LSIF 125 to supply a subsequent instruction to the reset controller circuitry 130. In some examples, the first duration 730 may be decreased by increasing a speed of communications between the LSIF 125 and the external source that supplies instructions. However, increasing the speed of communications limits the communications protocols that may be used by the LSIF 125.

In the example of FIG. 7B, the second timing diagram 710 includes a second example mirror voltage 735 and a second example electrode voltage 735. The second timing diagram 710 illustrates example normal reset operations of the waveform generation circuitry 225, using on-chip instructions. For example, the waveform generation circuitry 225 is only supplied instructions from the second memory 210 of FIG. 2. In such an example, the memory controller 220 supplies the waveform generation circuitry 225 with predetermined instructions.

The second mirror voltage 735 represents the mirror reset signal from the waveform generation circuitry 225. The second electrode voltage 740 represents the electrode reset signal from the waveform generation circuitry 225.

In the example of FIG. 7B, the waveform generation circuitry 225 is capable of modifying the voltages 735 and 740 at varying durations. For example, a first instruction sets the second mirror voltage 735 to be equal to the reset voltage for a second example duration 745, while a second instruction sets the second mirror voltage 735 to be equal to the offset voltage for a third example duration 750. Advantageously, the durations 745 and 750 may be different durations. However, reset waveforms with varying durations, such as the second mirror waveform 735, are predetermined by the on-chip instructions in the second memory 210.

In the example of FIG. 7C, the third timing diagram 715 includes a third example mirror voltage 755 and a third example electrode voltage 760. The third timing diagram 715 illustrates example normal reset operations of the waveform generation circuitry 225, using both on-chip instructions and off-chip instructions. For example, the memory controller 220 supplies instructions from both of the memories 205 and 210 to the waveform generation circuitry 225.

The third mirror voltage 755 represents the mirror reset signal from the waveform generation circuitry 225. The third electrode voltage 760 represents the electrode reset signal from the waveform generation circuitry 225. In the example of FIG. 7C, the waveform generation circuitry 225 is capable of modifying the voltages 755 and 760 at varying durations using either on-chip instructions or off-chip instructions.

In some examples, the first memory 205 supplies a plurality of instructions wherein each instruction includes a fourth example duration 765. In such examples, instructions of the plurality of instructions may modify the voltage of the third mirror voltage 755. Advantageously, including the duration indicators 460 and 470 in instructions allows for off-chip instructions to cause the waveform generation circuitry 225 to generate relatively high-speed reset waveforms, such as the third mirror voltage 755. Advantageously, including the multi-level reset indicator 450 in instructions allows for instructions to cause the waveform generation circuitry 225 to set the third mirror voltage 755 to one of a plurality of voltage levels.

In other examples, the waveform generation circuitry 225 may modify the third electrode voltage 760 based on the bi-level reset indicator 440 of FIG. 4 in on-chip or off-chip instructions. For example, a first instruction may cause the third electrode voltage 760 to be set equal to the source supply voltage for a fifth example duration 770. In such an example, a second instruction, subsequent to the first instruction may cause the third electrode voltage 760 to be equal to the offset voltage. Advantageously, including the bi-level indicator 440 in instructions allows for instructions to cause generation of a plurality of reset waveforms. Alternatively, the waveform generation circuitry 225 may be modified to include additional circuitry configured to generate additional reset signals based on additional reset indicators.

FIGS. 8A-8E are example timing diagrams of example reset signals generated by the waveform generation circuitry 225 of FIGS. 2, 3, and 5. The examples of FIGS. 8A-8E include a first example timing diagram 800, a second example timing diagram 804, a third example timing diagram 808, a fourth example timing diagram 812, and a fifth example timing diagram 816. The example timing diagrams 800-816 illustrate example operations of the waveform generation circuitry 225. The examples timing diagrams 804-816 of FIGS. 8B-8E illustrate how off-chip instructions may be combined with on-chip instructions to produce relatively complex reset waveforms.

Figure 8A:
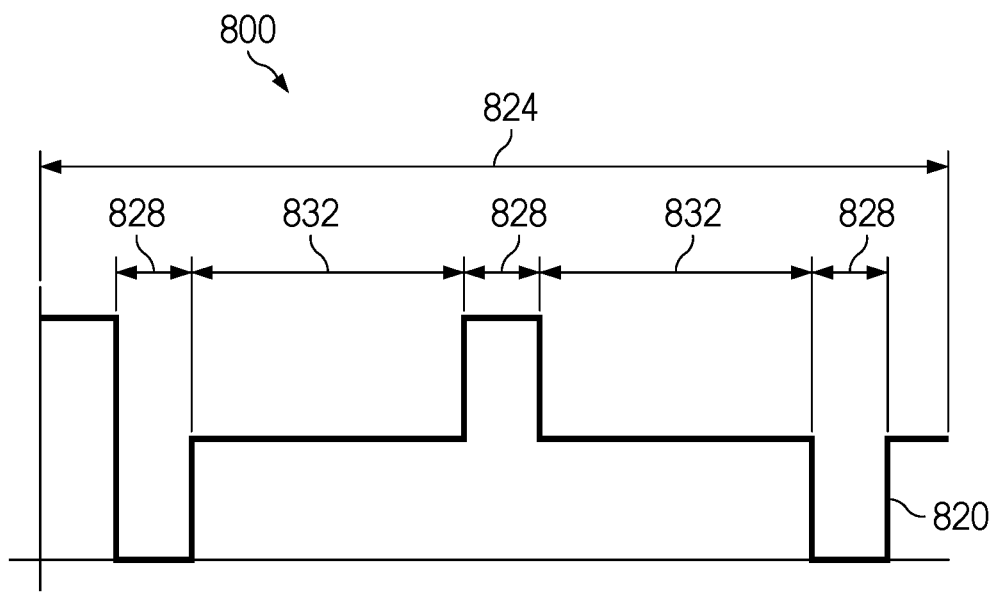
FIGS. 8A-8E are example timing diagrams of example reset signals generated by the waveform generation circuitry of FIGS. 2, 3, and 5.

In the example of FIG. 8A, the first timing diagram 800 includes a first example mirror voltage 820. The first mirror voltage 820 represents the mirror reset signal from the waveform generation circuitry 225. In the example of FIG. 8A, the first mirror voltage 820 is a reference waveform of a relatively low complexity. In some examples, complexity is determined based on considerations of: (1) a speed in which a waveform changes; and (2) a number of changes. In the example of FIG. 8A, the speed in which the waveform changes is represented by a second example duration 828 and a third example duration 832.

Figure 8B:
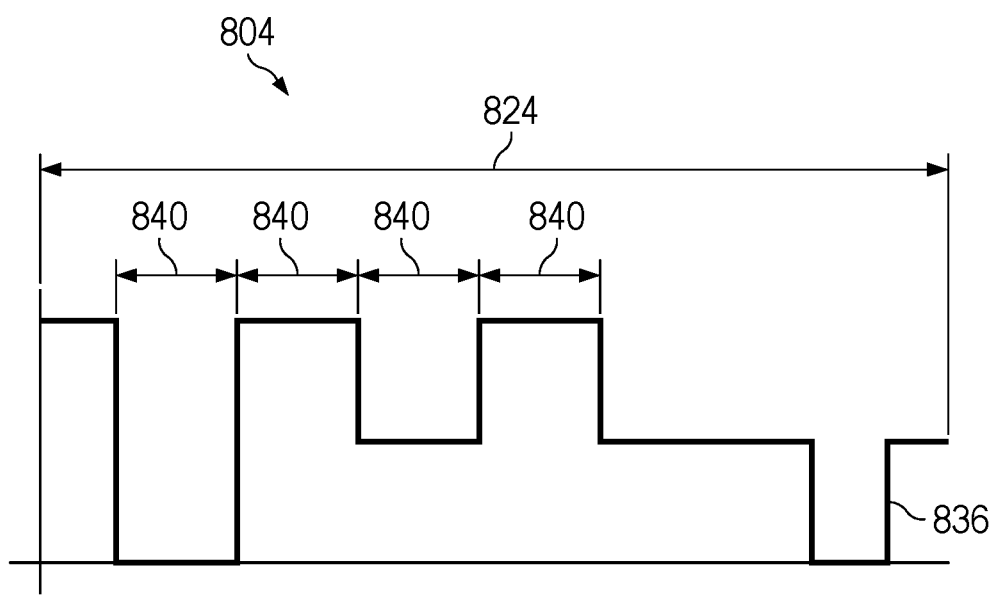

In the example of FIG. 8B, the second timing diagram 804 includes a second example mirror voltage 836. The second mirror voltage 836 represents the mirror reset signal from the waveform generation circuitry 225. In comparison to the first mirror voltage 820, the second mirror voltage 836 has more changes in the first duration 824. However, the speed in which the waveform changes is limited to increments of a fourth example duration 840. In the example of FIG. 8B, the second mirror voltage 836 illustrates how off-chip instructions allows for an increase in a number of changes with the caveat of limiting the speed of the changes to the fourth duration 840.

Figure 8C:
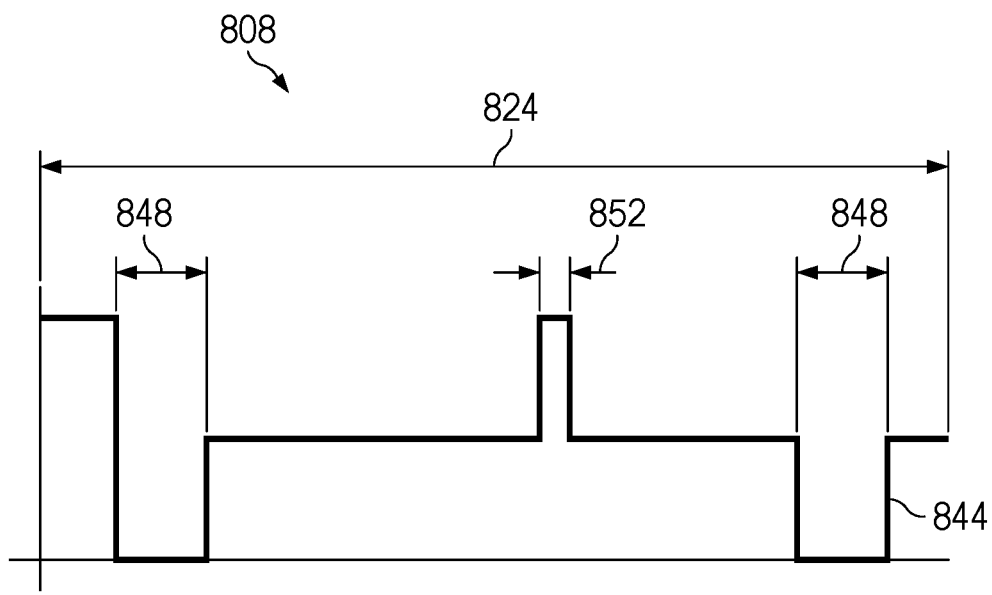

In the example of FIG. 8C, the third timing diagram 808 includes a third example mirror voltage 844. The third mirror voltage 844 represents the mirror reset signal from the waveform generation circuitry 225. In comparison to the first mirror voltage 820, the third mirror voltage 844 has the same number of changes in the first duration 824. However, voltage changes of the third mirror voltage 844 occur at speeds approximately equal to a fifth example duration 848 and a sixth example duration 852. The sixth duration 852 being a duration shorter than any of the durations 828, 832, and 840 of FIGS. 8A and 8B. Advantageously, using a finite state machine to implement the waveform generation circuitry 225 allows for use of relatively higher-speed circuitry which decreases durations needed between voltage changes.

Figure 8D:
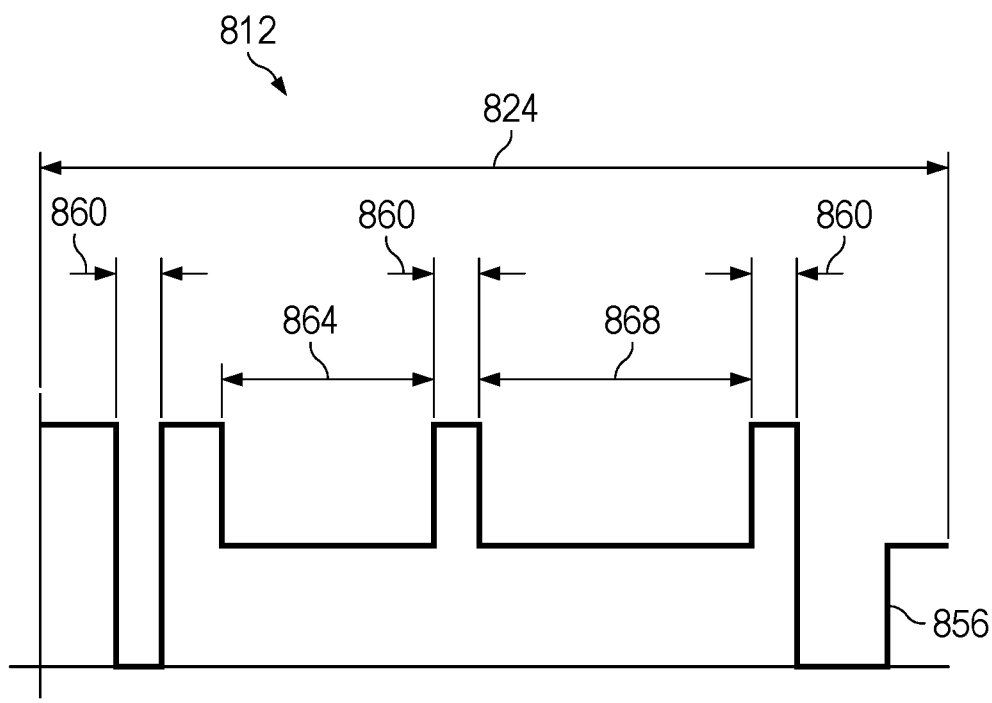

In the example of FIG. 8D, the fourth timing diagram 812 includes a fourth mirror voltage 856. The fourth mirror voltage 856 represents the mirror reset signal from the waveform generation circuitry 225. In comparison to the first mirror voltage 820, the fourth mirror voltage 856 changes more times in the first duration 824. Advantageously, the waveform generation circuitry 225 may change the fourth mirror voltage 856 for relatively short durations, such as an example seventh duration 860. Advantageously, the waveform generation circuitry 225 may vary durations between changes by modifying the duration indicators 460 and 470. For example, a first instruction may cause the waveform generation circuitry 225 to set the fourth mirror voltage 856 for an eighth example duration 864, a second instruction may set the fourth mirror voltage 856 for the seventh duration 860, and a third instruction may set the fourth mirror voltage 856 for a ninth example duration 868.

Figure 8E:
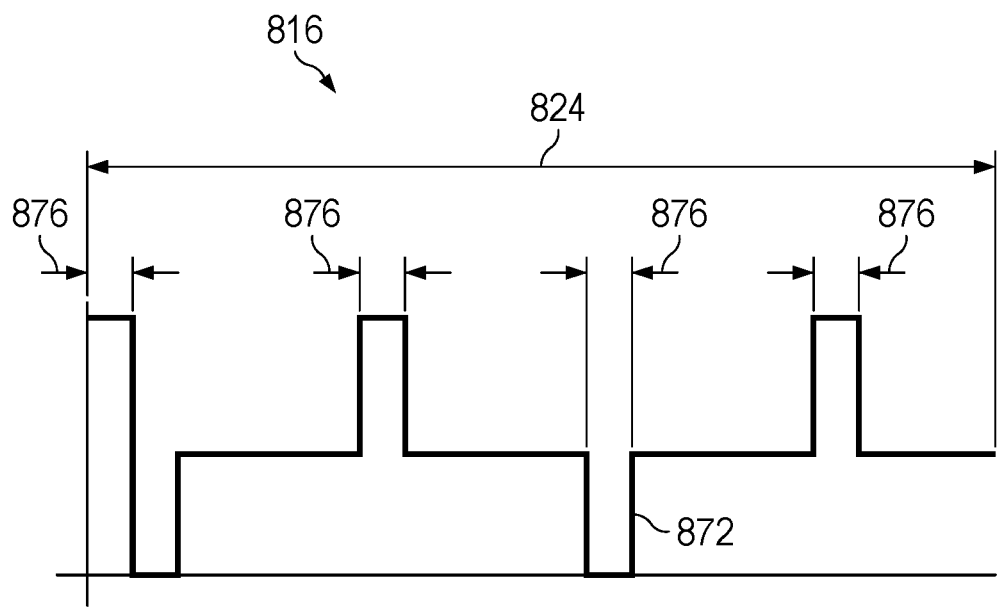

In the example of FIG. 8E, the fifth timing diagram 816 includes a fifth mirror voltage 872. The fifth mirror voltage 872 represents the mirror reset signal from the waveform generation circuitry 225. Unlike the mirror voltages 820, 836, and 844, the fifth mirror voltage 872 illustrates operation wherein the waveform generation circuitry 225 modifies for a tenth example duration 876. Advantageously, the waveform generation circuitry 225 may modify the fifth mirror voltage at relatively high speeds.

Figure 9:
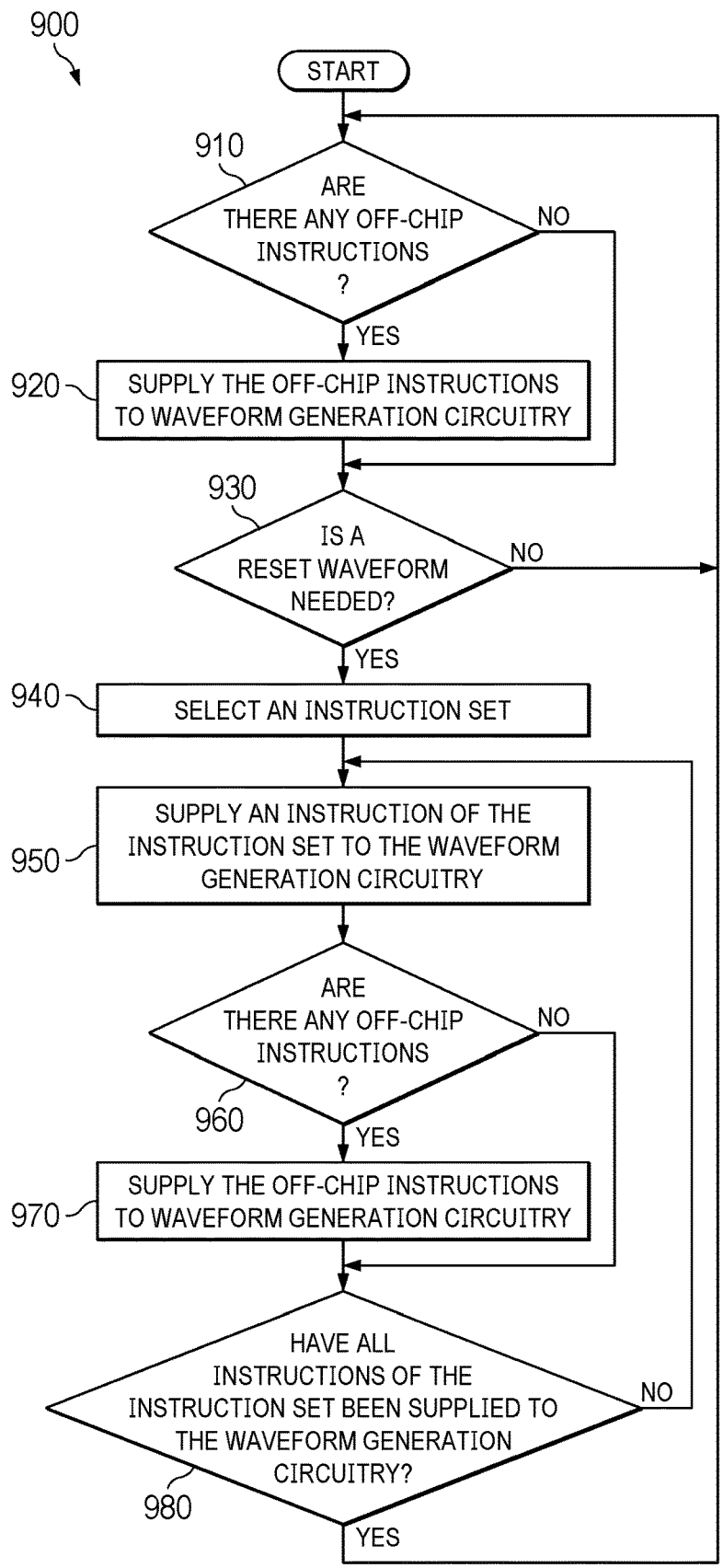
FIG. 9 is a flowchart representative of an example process that may be performed using machine-readable instructions that can be executed and/or hardware configured to implement the reset controller circuitry of FIGS. 1 and 2 to select instructions to generate reset signals using the waveform generation circuitry of FIGS. 2, 3, and 5.

FIG. 9 is a flowchart representative of an example process that may be performed using machine-readable instructions that can be executed and/or hardware configured to implement the reset controller circuitry 130 of FIGS. 1 and 2 to select instructions to generate a reset waveform using the waveform generation circuitry 225 of FIGS. 2 and 3. The machine-readable instructions and/or the operations 900 of FIG. 9 begin at block 910, at which the memory controller 220 determines if there are any off-chip instructions from the LSIF 125 of FIG. 1. (Block 910). In some examples, the memory controller 220 configures the multiplexer 215 of FIG. 2 to couple the first memory 205 of FIG. 2 to the memory controller 220. In such examples, the memory controller 220 determines if there are any off-chip instructions based on whether the first memory 205 supplies instructions to the memory controller 220. In other examples, the memory controller 220 may be coupled to the first memory 205 to determine whether off-chip instructions were received.

If the memory controller 220 determines that there are off-chip instructions (e.g., Block 910 returns a result of YES), the memory controller 220 supplies the off-chip instructions to the waveform generation circuitry 225. (Block 920). In some examples, the memory controller 220 configures the multiplexer 215 to supply instructions from the first memory 205 to the waveform generation circuitry 225.

If the memory controller 220 determines that there are no off-chip instructions (e.g., Block 910 returns a result of NO) or the memory controller 220 performs Block 920, the memory controller 220 determines if a reset waveform is needed. (Block 930). In some examples, the memory controller 220 determines whether a reset waveform is needed based on whether the mirror SRAM 110 of FIG. 1 has updated data of bit cells (e.g., the bit cell 175 of FIG. 1) of mirror cells (e.g., the micro-mirror cells 150 and 155 of FIG. 1). In such examples, the memory controller 220 may determine a need for a reset waveform when the mirror SRAM 110 has completed updating all mirror cells of a module (e.g., the modules 140 and 145 of FIG. 1) of the mirror array 115 of FIG. 1. In other examples, the memory controller 220 determines whether a reset waveform is needed based on a mode of operation of the DMD 100. For example, the memory controller 220 determines that a reset waveform corresponding to the park instruction set 240 of FIGS. 2 and 3 is needed in response to a determination that the DMD 100 is in a standby mode. In another example, the memory controller 220 determines that a reset waveform corresponding to the burn-in instruction set 235 of FIGS. 2 and 3 is needed in response to a determination that the DMD 100 is undergoing burn-in testing. If the memory controller 220 determines that there is no need for a reset waveform (e.g., Block 930 returns a result of NO), control returns to Block 910 to determine if any off-chip instructions have been received from the LSIF 125.

If the memory controller 220 determines that an instruction set is needed (e.g., Block 930 returns a result of YES), the memory controller 220 selects an instruction set. (Block 940). In some examples, the memory controller 220 selects the instruction set based on which reset operations are to be performed. For example, the memory controller 220 selects the operational instruction set 230 of FIGS. 2, 3, and 4 to generate a reset waveform which causes data of bit cells to be latched into one of the electrodes 180 or 185. In such an example, the normal waveform may cause the micro-mirror 160 of FIG. 1 to transition from the second mirror state 170 of FIG. 1 to the first mirror state 165 of FIG. 1, such as in the example of FIG. 6. In another example, the memory controller 220 selects the park instruction set 240 to cause micro-mirrors (e.g., the micro-mirror 160) to transition to a known state between the mirror states 165 or 170.

The memory controller 220 supplies an instruction of the instruction set to the waveform generation circuitry 225. (Block 950). In some examples, the memory controller 220 configures the multiplexer 215 to begin to supply instructions (e.g., instructions 410-430 of FIG. 4) of the instruction set, selected at Block 950, to the waveform generation circuitry 225. The control proceeds to Block 960.

The memory controller 220 determines if there are any off-chip instructions from the LSIF 125. (Block 960). Similar to operations at Block 910, the memory controller 220 determines the first memory 205 has received any off-chip instructions. In the example of FIG. 9, the memory controller 220 prioritizes off-chip instructions of the first memory 205 over instructions from the second memory 210 of FIGS. 2 and 3. Alternatively, the memory controller 220 may be configured to prioritize performance of instructions from the second memory 210.

If the memory controller 220 determines there are off-chip instructions (e.g., Block 960 returns a result of YES), the memory controller 220 supplies the off-chip instructions to the waveform generation circuitry 225. (Block 970). Similar to the operations of Block 920, the memory controller 220 may configure the multiplexer 215 to couple the first memory 205 to the waveform generation circuitry 225.

If the memory controller 220 determines there are no off-chip instructions (e.g., Block 960 returns a result of NO) or the memory controller 220 performs the operations of Block 970, the memory controller 220 determines if all instructions of the instruction set have been supplied to the waveform generation circuitry 225. (Block 980). In some examples, the memory controller 220 determines that there are no subsequent instructions of the instruction set based on a memory location in the second memory 210. In other examples, the memory controller 220 may determine all instructions of a look up table have been supplied to the waveform generation circuitry 225. If the memory controller 220 determines that all instructions of the instruction set of Block 940 have been supplied to the waveform generation circuitry 225 (e.g., Block 980 returns a result of YES), control returns to Block 910 to determine if any off-chip instructions have been received from the LSIF 125.

If the memory controller 220 determines that not all instructions of the instruction set of Block 940 have been supplied to the waveform generation circuitry 225 (e.g., Block 980 returns a result of NO), control returns to block 950, where the memory controller 220 supplies a subsequent instruction of the instruction set to the waveform generation circuitry 225.

Although example processes are described with reference to the flowchart illustrated in FIG. 9, many other methods of selecting instructions to generate reset waveforms may alternatively be used in accordance with teachings of this disclosure. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 10:
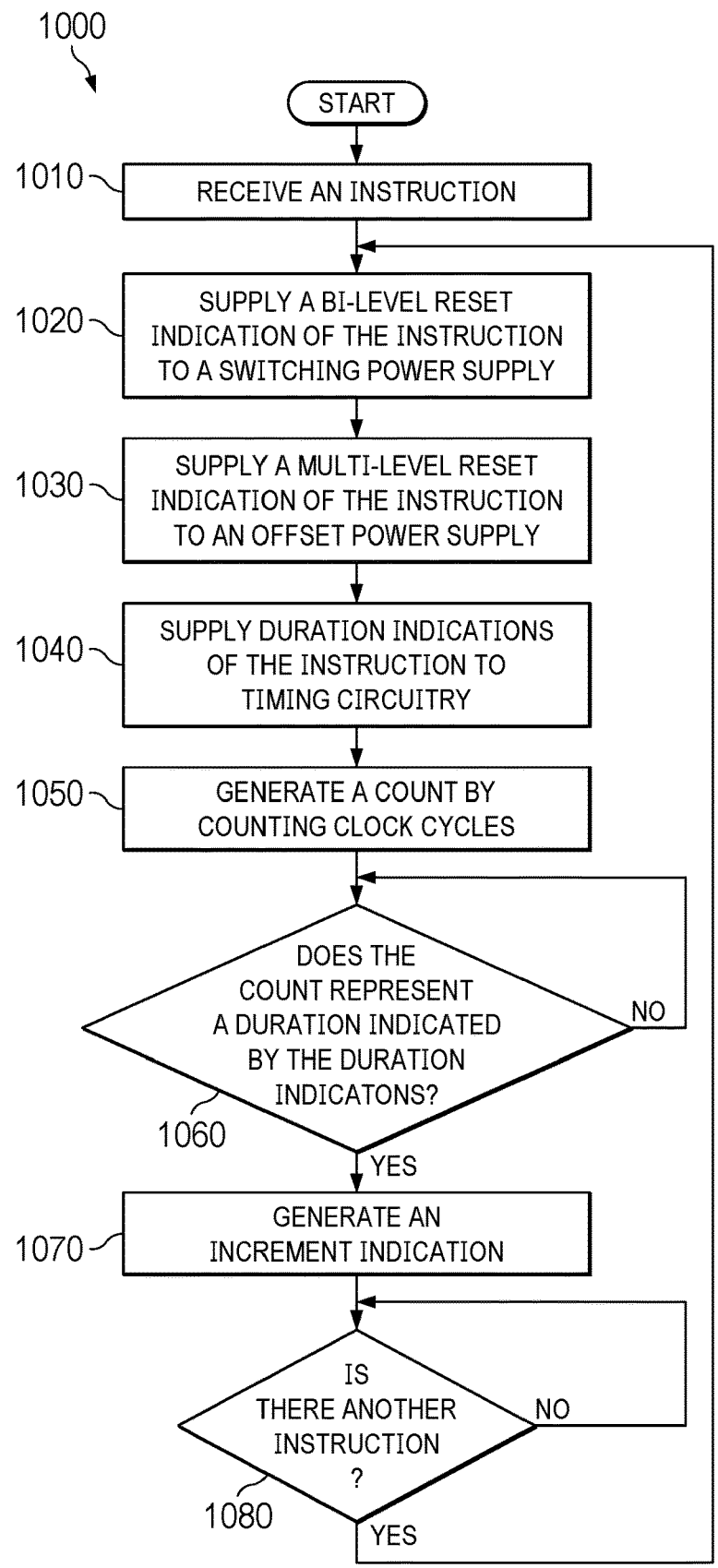
FIG. 10 is a flowchart representative of an example process that may be performed using machine-readable instructions that can be executed and/or hardware configured to implement the waveform generation circuitry of FIGS. 2, 3, and 5 to do generate reset signals.

FIG. 10 is a flowchart representative of an example process that may be performed using machine-readable instructions that can be executed and/or hardware configured to implement the waveform generation circuitry 225 of FIGS. 2, 3, and 5 to generate reset waveforms. The machine-readable instructions and/or the operations 1000 of FIG. 10 begin at Block 1010, at which the waveform generation circuitry 225 receives an instruction (e.g., the instructions 410-430 of FIG. 4). (Block 1010).

The waveform generation circuitry 225 supplies the bi-level reset indicator 440 of FIG. 4 of the instruction to the switching power supply 560 of FIG. 5. (Block 1020). In some examples, the bi-level reset indicator 440 may cause the switching power supply 560 to generate a DC offset voltage.

The waveform generation circuitry 225 supplies the multi-level reset indicator 450 of FIG. 4 of the instruction to the MBRST power supply 540 of FIG. 5. (Block 1030). In some examples, the multi-level reset indicator 450 causes the MBRST power supply 540 to generate one of a plurality of offset voltages.

The waveform generation circuitry 225 supplies the duration indicators 460 and 470 of FIG. 4 of the instruction to the timing circuitry 520 of FIG. 5. (Block 1040). In some examples, the fine duration indicator 470 indicates a number of clock cycles that the timing circuitry 520 is to count. For example, the timing circuitry 520 increments the count until the fine duration indicator 470 is equal to the count. In other examples, the number of clock cycles indicated by the fine duration indicator 470 is multiplied by a scalar value based on the coarse duration indicator 460. For example, the timing circuitry 520 increments the count to the number of clock cycles indicated by the fine duration indicator 470 eight times when the coarse duration indicator 460 is a logical one and the scalar value is eight.

The timing circuitry 520 generates a count by counting cycles of the second reference clock from the clock divider 120 of FIG. 1. (Block 1050). In some examples, the timing circuitry 520 increments the count for every cycle of the second reference clock. In such examples, the timing circuitry 520 may reset the count in response to a subsequent instruction.

The timing circuitry 520 determines if the count represents a duration indicated by the duration indicators 460 and 470. (Block 1060). If the timing circuitry 520 determines the count does not represent the duration indicated by the duration indicators 460 and 470 (Block 1060 returns a result of NO), control returns to Block 1060 and the timing circuitry 520 continues to count.

If the timing circuitry 520 determines the count represents the duration indicated by the duration indicators 460 and 470 (e.g., Block 1060 returns a result of YES), the timing circuitry 520 generates an increment indicator. (Block 1070). In some examples, the increment indicator indicates that the waveform generation circuitry 225 has executed an instruction.

The waveform generation circuitry 225 determines if there is another instruction. (Block 1080). If the waveform generation circuitry 225 determines there is not another instruction (Block 1080 returns a result of YES), the control returns to Block 1080 until a subsequent instruction is received. If the waveform generation circuitry 225 determines there is another instruction (Block 1080 returns a result of NO), the control returns to Block 1020 with the subsequent instruction.

Although example processes are described with reference to the flowchart illustrated in FIG. 10, many other methods of generating a reset waveform using instructions may alternatively be used in accordance with teachings of this disclosure. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 11:
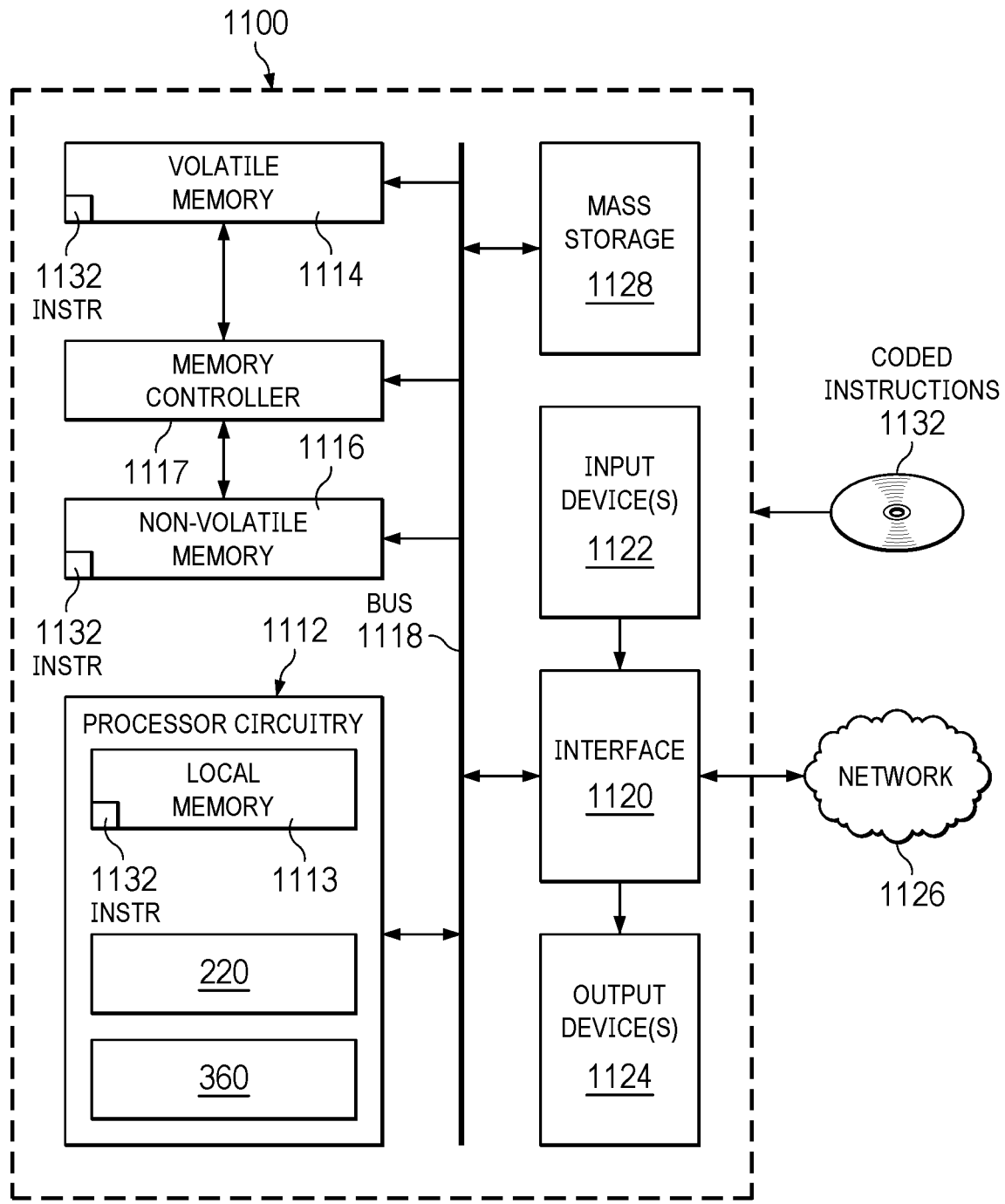
FIG. 11 is a block diagram of an example processing platform including processor circuitry structured to execute the example machine-readable instructions and/or the example operations of FIG. 9.

FIG. 11 is a block diagram of an example processor platform 1100 structured to execute and/or instantiate the machine-readable instructions and/or the operations of FIGS. 7 and 8 to implement the memory controller 220 of FIG. 2 and 360 of FIG. 3. The processor platform 1100 can be, for example a personal computer, a workstation, a self-learning machine (e.g., a neural network), a mobile device (e.g., a cell phone, a smart phone, a tablet such as an iPad™), a personal digital assistant (PDA), a DVD player, a CD player, a digital video recorder, a Blu-ray player, a gaming console, a personal video recorder, a set top box, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the memory controllers 220 and 360.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a DMD, and/or any SLM. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine-readable instructions 1132, which may be implemented by the machine-readable instructions of FIGS. 7 and 8, may be stored in the mass storage device 1128, in the volatile memory 1114, in the non-volatile memory 1116, and/or on a removable non-transitory computer readable storage medium such as a CD or DVD.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

Example methods, apparatus and articles of manufacture described herein improve reset waveform generation.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

Modifications are possible in the described embodiments, and other embodiments are possible, within the scope of the claims.

What is claimed is:

1. An apparatus comprising:
   a multiplexer;
   a first memory coupled to the multiplexer;
   a second memory coupled to the multiplexer, the second memory including a bi-level reset indicator, a multi-level reset indicator, and a duration indicator;
   a memory controller coupled to the multiplexer; and
   waveform generation circuitry coupled to the memory controller, the waveform generation circuitry including:
      a first power supply configured to receive the bi-level reset indicator;
      a second power supply configured to receive the multi-level reset indicator; and
      timing circuitry configured to receive the duration indicator.

2. The apparatus of claim 1, wherein an instruction that is part of a first plurality of instructions in the second memory comprises the bi-level reset indicator, the multi-level reset indicator, and the duration indicator, the second memory further including a second plurality of instructions, and the memory controller configured to couple one of the first plurality of instructions or the second plurality of instructions to the waveform generation circuitry.

3. The apparatus of claim 2, wherein the first plurality of instructions cause the waveform generation circuitry to generate first reset waveforms and the second plurality of instructions cause the waveform generation circuitry to generate second reset waveforms.

4. The apparatus of claim 1, wherein the duration indicator is a fine duration indicator, the second memory further including a coarse duration indicator.

5. The apparatus of claim 1, wherein timing circuitry is configured to generate a count by counting a number of cycles of a reference clock, compare the count to the duration indicator, and generate an indicator in response to the count reaching a count identified by the duration indicator.

6. The apparatus of claim 1, wherein the first power supply is configured to generate a first waveform based on an offset voltage, and the bi-level reset indicator is configured to cause the first power supply to modify the offset voltage between two voltages.

7. The apparatus of claim 1, wherein the second power supply is configured to generate a second waveform based on an offset voltage, and the multi-level reset indicator is configured to cause the second power supply to modify the offset voltage between four voltages.

* * * * *